US012472980B1

(12) United States Patent
Kobilarov et al.

(10) Patent No.: US 12,472,980 B1
(45) Date of Patent: Nov. 18, 2025

(54) OBJECT RELEVANCE FILTERING

(71) Applicant: Zoox, Inc., Foster City, CA (US)

(72) Inventors: Marin Kobilarov, Baltimore, MD (US); Linjun Zhang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 352 days.

(21) Appl. No.: 18/068,699

(22) Filed: Dec. 20, 2022

(51) Int. Cl.
*B60W 60/00* (2020.01)
*B60W 50/00* (2006.01)

(52) U.S. Cl.
CPC .... *B60W 60/0011* (2020.02); *B60W 50/0097* (2013.01); *B60W 60/00274* (2020.02); *B60W 60/00276* (2020.02); *B60W 2554/402* (2020.02); *B60W 2554/4041* (2020.02); *B60W 2554/4045* (2020.02); *B60W 2554/806* (2020.02)

(58) Field of Classification Search
None
See application file for complete search history.

(56) References Cited

U.S. PATENT DOCUMENTS

| | | | |
|---|---|---|---|
| 11,392,128 B1 | 7/2022 | Ma et al. | |
| 11,429,105 B2* | 8/2022 | Sorin | G05D 1/0217 |
| 12,110,042 B1 | 10/2024 | Hoang et al. | |
| 12,128,895 B2* | 10/2024 | Seong | B60W 30/18159 |
| 2008/0309468 A1 | 12/2008 | Greene et al. | |
| 2018/0370528 A1 | 12/2018 | Rittger et al. | |
| 2019/0084560 A1 | 3/2019 | Lee | |
| 2020/0149906 A1 | 5/2020 | Tu et al. | |
| 2020/0189573 A1* | 6/2020 | King | B60R 21/0134 |
| 2020/0377085 A1* | 12/2020 | Floyd-Jones | B60W 60/0011 |
| 2021/0122380 A1 | 4/2021 | Lan et al. | |
| 2022/0017122 A1 | 1/2022 | Malla et al. | |
| 2022/0048503 A1 | 2/2022 | Khandelwal et al. | |
| 2022/0153307 A1 | 5/2022 | Choi et al. | |
| 2022/0153314 A1 | 5/2022 | Suo et al. | |

(Continued)

FOREIGN PATENT DOCUMENTS

| | | |
|---|---|---|
| KR | 101590787 B1 | 2/2016 |
| KR | 20190004708 A | 1/2019 |
| KR | 102337011 B1 | 12/2021 |

OTHER PUBLICATIONS

Advantages and Disadvantages of Array in C (Year: 2021).*

(Continued)

*Primary Examiner* — Brian P Sweeney
*Assistant Examiner* — David Hatch
(74) *Attorney, Agent, or Firm* — Lee & Hayes, P.C.

(57) ABSTRACT

Systems and techniques for whether to associate predicted trajectories of objects detected in an environment with candidate vehicle trajectories are described. A vehicle traversing an environment may have several candidate actions that may be used to control the vehicle. Predicted object trajectories may be excluded from further processing based on a relevancy score determination. Various factors may be evaluated to determine the relevancy score associated with a predicted object trajectory and candidate vehicle action pair that indicated the impact of the predicted object trajectory and candidate vehicle action. A resultant trajectory may be determined using only those relevant predicted object trajectories.

20 Claims, 7 Drawing Sheets

(56) References Cited

U.S. PATENT DOCUMENTS

2023/0182782 A1   6/2023   Zhang
2024/0176989 A1   5/2024   Lyu et al.

OTHER PUBLICATIONS

Office Action for U.S. Appl. No. 17/550,996, mailed on Aug. 4, 2023, Zhang, "Identifying Relevant Objects Within an Environment", 25 pages.
Notice of Allowance mailed Jan. 16, 2025 in related U.S. Appl. No. 17/854,269 (15 pages).
The PCT Search Report and Written Opinion mailed Mar. 22, 2023 for PCT application No. PCT/US2022/079803, 13 pages.

* cited by examiner

α = Object vulnerability weighting factor
w = Relevance score
t = Occupancy time

OBJECT RELEVANCE FILTERING

BACKGROUND

Perception systems and prediction systems utilize sensor data from sensors of a vehicle in order to determine information about objects within an environment, such as the locations, predicted trajectories, and predicted velocities of such objects. This information is then used by planning systems to determine actions for the vehicle to perform while operating in the environment. For instance, the planning systems may determine actions in order to avoid the objects, such as by yielding to the objects, changing lanes to avoid the objects, paths to travel to remain on course to a planned destination, etc. These actions may be represented as trajectories that can be used to control the vehicle. However, based on the number of objects within the environment, the planning systems may require a large amount of computing resources (e.g., memory, processing power, etc.) and/or an increased processing time to determine the actions thereby limiting performance of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
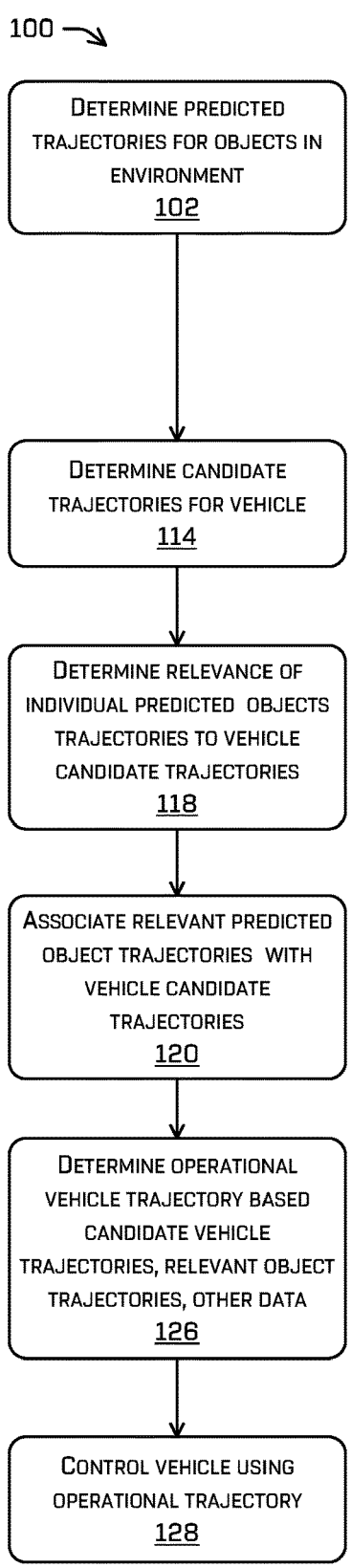
FIG. 1 is a pictorial flow diagram illustrating an example process for determining predicted trajectories and relevant object trajectories in order to determine an operational trajectory for a vehicle, in accordance with examples of the disclosure.
Figure 1:
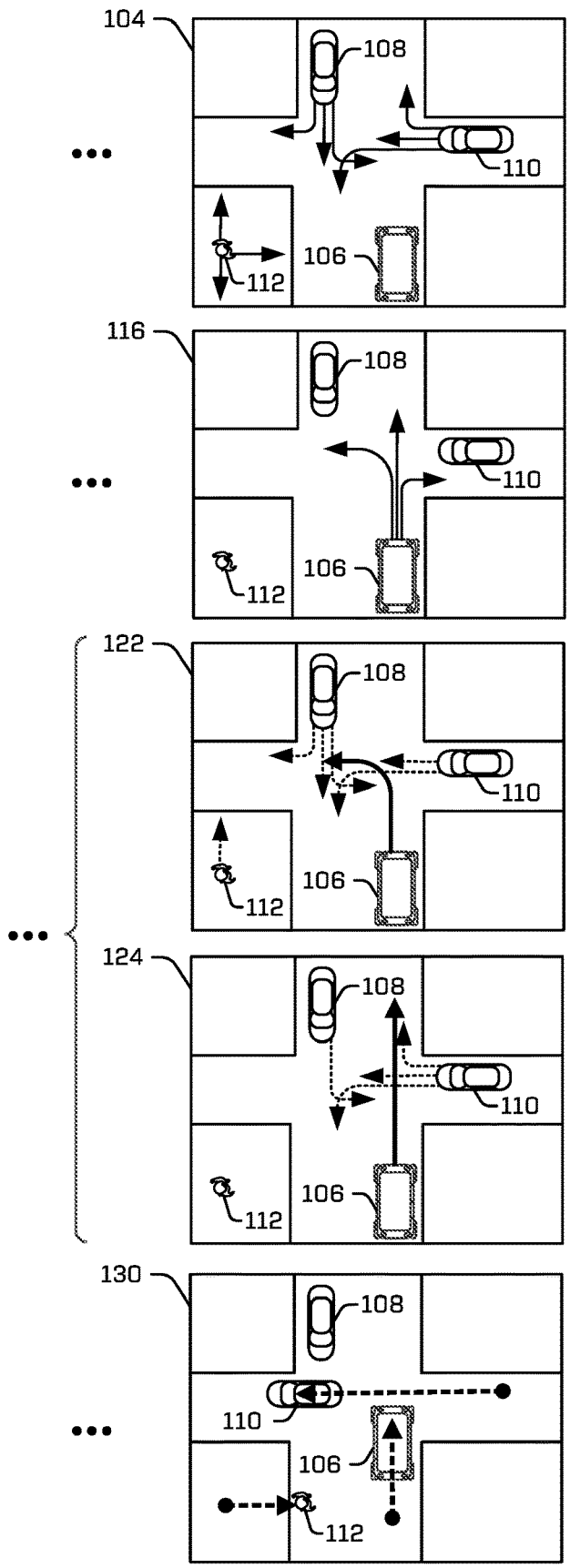

Techniques for determining relevant objects for candidate vehicle trajectories based on predicted object behavior are discussed herein. As described herein, candidate vehicle trajectories may be determined for a vehicle, such as an autonomous vehicle, traversing an environment. In examples, candidate trajectories may be determined for particular purposes. For example, a candidate trajectory may include vehicle controls that may be implemented to control a vehicle along a planned path or route through an environment. Another example candidate trajectory may include vehicle controls that may be implemented to control a vehicle to return to an intended position or location in an environment in response to detecting that the vehicle is not in an expected position and/or location. Another example candidate trajectory may include vehicle controls that may be implemented to control a vehicle around or to otherwise avoid an object or obstacle detected in an environment. In various examples, a vehicle computing system may determine, generate, receive, maintain, or otherwise have available multiple candidate trajectories associated with various conditions that may be used to control the vehicle through an environment. While traversing an environment, a vehicle computing system may determine an operational trajectory from among available candidate trajectories for use in controlling the vehicle. The determination of an operational trajectory may be based on one or more factors, such as the detection of objects within the environment. Because such factors may be updated regularly and/or substantially continuously, the operational trajectory may also be determined and/or updated regularly and/or substantially continuously to maintain safe and comfortable operation of the vehicle through the environment.

A vehicle traversing an environment may identify or otherwise detect one or more objects within the environment. A vehicle computing system configured at the vehicle may determine one or more predicted trajectories for these individual objects. The vehicle computing system may determine the operational trajectory based on predicted trajectories of one or more objects within the environment. For example, the vehicle computing system may determine whether and how an object in the environment may intersect with or otherwise interact with a candidate trajectory. Based on this information, the vehicle computing system may determine whether to use that candidate trajectory to control the vehicle. For instance, the vehicle computing system may determine, based on a predicted trajectory for a particular object, that the particular object has a high probability (e.g., above a threshold probability) of intersecting with the vehicle if the vehicle is controlled according to a particular candidate trajectory. Therefore, the vehicle computing system may assign a low score or weighting to that particular candidate trajectory in the operational trajectory selection process or otherwise take one or more actions to reduce a likelihood that the particular candidate trajectory is determined as an operational trajectory (e.g., a candidate trajectory which has been selected and is currently being executed).

In examples, objects within an environment and/or their predicted trajectories may or may not have the potential to affect one or more candidate trajectories. For example, a dynamic object in an environment, such as another vehicle, may be traveling parallel to a vehicle and, based on a first of the dynamic object's predicted trajectories, will continue to travel parallel to and past the vehicle. That first predicted trajectory may have no impact on a first candidate trajectory for the vehicle that controls the vehicle to continue traveling in its current direction without turning. However, the first predicted trajectory for the dynamic object may potentially affect a second candidate trajectory for the vehicle that includes one or more controls that cause the vehicle to turn into the predicted path of the dynamic object represented in the first predicted trajectory. Likewise, a second predicted trajectory for the dynamic object that includes a predicted path of the dynamic object that intersects the path of the vehicle as represented in the first candidate trajectory for the vehicle may likely affect the first candidate trajectory. In these examples, knowledge of the first predicted trajectory for the dynamic object may provide value to the evaluation of the second candidate trajectory but may not provide value to the evaluation of the first candidate trajectory.

In examples, a relevance of predicted trajectories for one or more objects may be determined in relation to one or more candidate vehicle trajectories. The relevance of a predicted object trajectory to a particular candidate vehicle trajectory may be represented as a relevance score. Based on these relevance scores, a vehicle computing system may include or filter predicted object trajectories from data associated with candidate vehicle trajectories. Because data stored for an individual candidate vehicle trajectory may include data associated with other potentially impacting factors, such as objects in the environment and their predicted trajectories, by filtering out data that is unlikely to impact operation of the vehicle from candidate trajectory data, the disclosed systems and techniques may improve the efficiency of a vehicle computing system by reducing the memory and processing requirements associated with determining trajectories for the associated vehicle that are irrelevant (e.g., below a threshold relevance) to planned operation of the vehicle. The techniques described herein also maintain and improve vehicle safety and driving efficiency by ensuring that the relevant objects and driving scenarios are being timely evaluated by the vehicle, thereby generating more efficient and accurate trajectories.

When a vehicle, such as an autonomous vehicle, is operating within an environment, the vehicle may receive sensor data (e.g., captured by sensors of the vehicle or received from remote sensors) associated with the surrounding environment. The sensor data, which may include image data, radar data, lidar data, etc., may be analyzed by the autonomous vehicle to detect and classify various objects within the operating environment. An autonomous vehicle may encounter various different types of objects within different driving environments, including dynamic objects that are capable of movement (e.g., vehicles, motorcycles, bicycles, pedestrians, animals, etc.) and/or static objects (e.g., buildings, road surfaces, trees, signs, barriers, parked vehicles, etc.). In order to safely traverse driving environments, an autonomous vehicle may include various components configured to detect objects and determine attributes of the detected objects. In some examples, a perception component of the autonomous vehicle may include various models and/or components to detect objects based on sensor data, in addition to classifying the objects. One or more prediction components of the autonomous vehicle may use the object detection and classification to generate predicted information (e.g., trajectories, likelihoods associated with trajectories, etc.) associated with the objects.

In some examples, the vehicle may identify relevant objects within an environment based on the predicted information. The vehicle may identify potential interactions (e.g., direct and indirect) between a candidate trajectory that may be followed by the vehicle and the predicted trajectories of objects within the environment. Based on identifying the potential interactions, the vehicle may determine a respective relevance score for individual (e.g., some or all) predicted object trajectories for individual (e.g., some or all) candidate vehicle trajectories.

When determining relevant objects and their associated trajectories within an environment, a vehicle computing system may determine one or more predicted object trajectories. When evaluating candidate vehicle trajectories to determine an operational trajectory for a vehicle, the vehicle computing system may associate predicted object trajectories with individual candidate vehicle trajectories so that individual candidate trajectory data includes adequate information related to objects in the environment. However, in many examples, one or more of the predicted object trajectories may be incapable of or unlikely to affect one or more of the candidate vehicle trajectories. For example, a particular predicted object trajectory may not intersect a particular candidate vehicle trajectory (e.g., if the trajectories are followed, the vehicle and the object are incapable of or unlikely to intersect). Consequently, a particular predicted object trajectory may or may not be relevant to a particular candidate vehicle trajectory. Data storage resources may be wasted by storing data associated with irrelevant predicted object trajectories with a candidate vehicle trajectory, and data processing resources may further be wasted processing irrelevant predicted object trajectory data in evaluating the candidate vehicle trajectory in determining an operational trajectory for the vehicle.

To address the technical problems and inefficiencies of storing and processing data that may be irrelevant to candidate vehicle trajectories, the techniques described herein include using a relevancy filter-based system (which also may be referred to as a "relevance filter") to determine relevant predicted object trajectories for to associated with one or more candidate vehicle trajectories for subsequent processing. Initially, the relevance filter, for example, as implemented and/or executed by a vehicle computing system, may receive a candidate trajectory or path for a vehicle (e.g., an autonomous vehicle) to follow within an environment. As non-limiting examples, such candidate trajectories may be associated with one or more proposed actions (e.g., continue along a path, merge left, merge right, slow down, etc.) for the vehicle to take at a particular step in time. In at least some such examples, the actions may be limited or otherwise constrained based on static and or dynamic objects in an environment, a desired destination point, and the like. In some examples, the path may be based on a combination of a current position and/or location of the vehicle, the vehicle dynamics, and/or map data. In at least some examples, such proposed actions may be associated with one or more various future points in time as may be used in, for example, a tree search in order to determine an overall optimized trajectory for control of the vehicle. Additional details for how such a tree may be created may be found in the U.S. patent application Ser. No. 17/394,334 entitled "Vehicle Trajectory Control Using a Tree Search" filed on Aug. 4, 2021, the entire contents of which are hereby incorporated by reference.

In those examples in which a tree search is used, actions may be associated with an index for every time step ranging from a lowest index associated with one side of a lane to a highest index associated with the other side of the lane. As a non-limiting example of which, in an example having five distinct actions (turn left, merge left, continue straight, merge right, turn right) a "0" may be associated with a left turn action, whereas a "4" would be associated with a right turn action. As will be described in detail below, various actions may be proposed for each time step and the tree search may result in switching between actions at successive time steps along a proposed time horizon. In those instance in which actions change from time step to time step, all intervening relevant objects may be considered. For example, if a tree search indicates an optimal path as beginning to merge left (index 1) and then subsequently beginning to merge right (index 3), all objects determined to be relevant associated with all actions between index 1 and 3 may be considered, as will be discussed in more detail herein.

A perception component may detect and classify one or more objects within the environment. A prediction component may additionally determine a number of predicted trajectories associated with the detected object(s). In some examples, the perception and prediction components may send information regarding the objects(s) (e.g., object classification, predicted trajectories, likelihoods of individual trajectories, etc.) to the relevance filter.

In some examples, the vehicle computing system may generate an occupancy grid associated with a particular candidate vehicle trajectory. The occupancy grid may be an estimation of where the autonomous vehicle may travel based on the autonomous vehicle following the candidate trajectory. In some examples, the vehicle computing system may determine a range of times during which the vehicle is estimated to occupy particular portions of the occupancy grid based on the autonomous vehicle's dynamics and/or capabilities (e.g., maximum and minimum accelerations, maximum and minimum velocities, current velocity, current steering angle and/or heading, maximum and/or minimum steering angles/rates, etc.). The vehicle computing system may further determine a predicted pose (e.g., position and/or heading/orientation) for the vehicle at the respective portions of the occupancy grid. The vehicle computing system may also determine a range of time during which individual objects detected in the environment may occupy particular portions of the occupancy grid based on the predicted trajectories of such objects. The vehicle computing system may further determine a predicted pose (e.g., position and heading) for such objects at the respective portions of the occupancy grid.

In various examples, the occupancy grid may be a data structure representing a portion of the environment, such as a top-down view of the environment. The portion of the environment represented by the occupancy grid may be a portion of the environment that the vehicle may be capable of traversing over a period of time (e.g., 5 seconds, 8 seconds, 10 seconds, etc.). This portion of time may be based on a "decision horizon" associated with the vehicle's computing system that may be a period of time into the future for which the vehicle computing system may be configured to predict and determine trajectories. The occupancy grid may be divided into "cells" or geographical portions of a particular size (e.g., 2×2 meters, 4×4 meters, 5×5 meters, etc.). The cell size used in an occupancy grid may be determined based on computing and data storage resource efficiency. A cell of an occupancy grid may be an array of states, where individual states in a cell's state array may be associated with an occupation time and a pose for either the vehicle (on the candidate trajectory associated with the occupancy grid) or an object on a particular predicted object trajectory.

In examples, for individual cells of a particular occupancy grid associated with a candidate vehicle trajectory, an occupancy time range may be determined for individual objects associated with particular predicted object trajectories and for a vehicle associated with the candidate vehicle trajectory. A pose may also, or instead, be determined for individual cells of the grid for the individual objects and the vehicle. A relevancy score may then be determined for the individual object data in individual cells and evaluated to determine whether the associated predicted object trajectory is relevant to the vehicle and the candidate vehicle trajectory associated with the occupancy grid.

For example, for a cell of an occupancy grid associated with a particular candidate vehicle trajectory, a minimum occupancy time may be determined for an object associated with a particular predicted object trajectory or for the vehicle based on various factors (e.g., vehicle or object maximum acceleration, velocity, heading, etc.). This minimum occupancy time may represent the earliest time that the vehicle or object may occupy the associated cell. Additionally or alternatively, a maximum occupancy time may be determined for the object associated with the particular predicted object trajectory or for the vehicle based on various factors (e.g., vehicle or object maximum deceleration, reduction in velocity, heading, etc.). This maximum occupancy time may represent the latest time that the vehicle or object may occupy the associated cell. Using the minimum and maximum occupancy time, the vehicle computing system may determine an occupancy time range for the object or vehicle. These values may be associated with particular states in the state array for the associated cell. Various examples of techniques for determining minimum occupancy times, maximum occupancy times and occupancy time ranges are described in more detail herein, including in regard to FIGS. 2-4. Nonetheless, such a score may be indicative of a likelihood a cell will be occupied at a particular point in time. In various examples, occupancy may be determined for more than one object at a particular instance in time for a given set of trajectories (e.g., of the object(s) and/or vehicles).

Using the data associated with the occupancy grid, the vehicle computing system may determine a relevancy score for individual pairs of states in a state array for a cell in the occupancy grid. In various examples, a null or zero relevancy score may indicate no relevancy to a vehicle and particular candidate trajectory associated with an occupancy grid. In examples, the vehicle computing system may determine whether a pair of states associated with an individual cell are associated with a same object. For example, if the two states of the pair of states are both associated with the vehicle, they are not relevant to determining whether to use the associated candidate vehicle trajectory as an operational trajectory. Similarly, if the two states of the pair of states are both associated with the same object, they are not relevant to determining whether to use the associated candidate vehicle trajectory as an operational trajectory. The vehicle computing system may in turn assign a zero or null relevancy score to this pair of states.

If the two states of the pair of states are not associated with the same object (e.g., if they are associated with the vehicle and another, distinct object), the vehicle computing system may determine whether the two states indicate that the two distinct objects are traveling in parallel directions or substantially parallel directions. If so, the vehicle computing system may determine that they are not relevant to determining whether to use the associated candidate vehicle trajectory as an operational trajectory because they are unlikely to intersect (e.g., at the portion of the environment represented by that cell). The vehicle computing system may in turn assign a zero or null relevancy score to this pair of states.

In some examples, the association of the vehicle with at least one state may be a threshold condition for determining whether a pair of states is relevant. For example, if both states in a pair of states are associated with the vehicle, they may be determined as not relevant to determining whether to use the associated candidate vehicle trajectory as an operational trajectory as described above. If neither state in a pair of states is associated with the vehicle, they may be determined as not relevant to determining whether to use the associated candidate vehicle trajectory as an operational trajectory because the vehicle is not involved in either. If one state in a pair of states is associated with the vehicle, they may be determined to be relevant to determining whether to use the associated candidate vehicle trajectory as an operational trajectory because there is at least the possibility of intersection between the object and the vehicle. In other examples, the association of the vehicle with a state may be excluded from a relevancy determination.

If the two states of the pair of states are not associated with the same object and/or the two objects are not traveling in parallel directions (and/or, in some examples, one of the states is associated with the vehicle and one is not), the vehicle computing system may determine a relevancy score based on the occupancy times associated with the two states. For example, the vehicle computing system may determine whether there is any overlap of the occupancy time ranges associated with the two states. If there is no overlap, the vehicle computing system may assign a zero or null relevancy score to this pair of states because there is a very low probability that the two objects will occupy the cell at the same time. However, if there is overlap between the occupancy time ranges associated with the two states, the vehicle computing system may determine a relevancy score for this pair of states based on the occupancy times such that the larger the overlap of the occupancy times, the higher the relevancy score.

The relevancy score may be further weighted using an object vulnerability weighting factor that may increase the relevancy score based on the vulnerability of the associated object(s). For example, the weighting factor may be used to increase the relevancy score for pedestrians and/or reduce the relevancy score for busses and trucks. Various detailed examples of techniques for determining relevancy scores and applying weighting factors are described in more detail herein, including in regard to FIGS. 2-4.

The vehicle computing system may determine an aggregate relevancy score for individual predicted object trajectories represented in an occupancy grid for a particular candidate vehicle trajectory. In examples, the vehicle computing system may determine an average relevancy score for a predicted object trajectory based on averaging the relevancy scores in the individual cells of the occupancy grid for that predicted object trajectory. In some examples, the vehicle computing system may average the non-zero relevancy scores in cells of the occupancy grid for the predicted object trajectory, while in other examples, the vehicle computing system may average all (e.g., zero and non-zero) relevancy score for the predicted object trajectory. In other examples, the aggregated relevancy score for a predicted object trajectory may be set to the highest relevancy score associated with the predicted object trajectory for any cell in the occupancy grid, thereby ensuring that any object relevancy is accentuated to improve safety considerations in determining an operational trajectory for a vehicle.

The vehicle computing system may compare the determined aggregated relevancy score (or other relevancy score) for a particular predicted object trajectory to a threshold relevancy score value to determine if the predicted object trajectory should be associated with the candidate vehicle trajectory associated with the occupancy grid. If so, the vehicle computing system may associate predicted object trajectory data with the candidate vehicle trajectory and process such data to determine whether the candidate vehicle trajectory should be used as an operational trajectory for the vehicle. In at least some examples, such a relevancy score may simply be a binary indication or may otherwise be associated with a threshold of "0."

In various examples, the vehicle computing system may perform this relevancy score determination and evaluation for individual trajectories of the available candidate vehicle trajectories. In examples, a vehicle may switch from using a first candidate vehicle trajectory as an operational trajectory to using a second, different, candidate vehicle trajectory as its operational trajectory. Of course, as used herein, such candidate trajectories may be reflective of associated actions as described above. In such examples, the vehicle computing system may determine and evaluate relevancy scores for object associated with both the first candidate vehicle trajectory and the second candidate trajectory, as well as any intermediate trajectories. For example, candidate vehicle trajectories may be ordered laterally based on a current operational trajectory. If the vehicle is following the first trajectory and determines to change to the second trajectory, and there are one or more intermediate trajectories laterally located between the first and second trajectories, the vehicle computing system may determine and evaluate relevancy scores for the individual intermediate trajectories as well as the first and second trajectories. Various examples of techniques for changing operational trajectory and determining intermediate relevancy scores are described in more detail herein, including in regard to FIG. 5.

Once relevant objects have been determined, additional computational resources may be dedicated to performing an optimization over the tree search, using active prediction systems for such objects (e.g., as may be described in U.S. patent application Ser. No. 17/535,357 entitled "Encoding Relative Object Information into Edge Features" filed on Nov. 24, 2021, the entire contents of which are hereby incorporated by reference) to better account for motion of such objects in response to vehicle actions, and the like.

The systems and techniques described herein may be directed to leveraging trajectory data, vehicle operational data, object detection data, and/or other data to enable a vehicle, such as an autonomous vehicle, to more accurately determine a vehicle trajectory that may account for relevant objects in an environment for improved vehicle control and operational safety, facilitating safer navigation through an environment and increased vehicle resources utilization efficiency. In particular examples, the systems and techniques described herein can utilize data structures (e.g., representing an occupancy grid) containing data representing a region of an environment, predicted trajectories of objects in the environment, candidate vehicle trajectories, occupancy times and/or ranges of time, and/or vehicle and/or object headings and/or positions. By using the relevancy filtering techniques described herein to more accurately determine relevant object data for a candidate trajectory that may be used as an operational trajectory, the examples described herein may result in increased safety and accuracy of vehicle control, especially vehicle operations proximate to objects in an environment, thereby allowing an autonomous vehicle to more safely operate in the environment. For example, the techniques described herein may be faster and/or more robust than conventional techniques, as they may increase the ability of an autonomous vehicle to safely navigate in an environment and more smoothly implement vehicle control operations, which may, in turn, provide more comfortable rider experiences. That is, techniques described herein provide a technological improvement over existing object detection and vehicle trajectory determination technology.

The techniques described herein may also improve the operation of computing systems and increase resource utilization efficiency. For example, computing systems, such as vehicle computing systems, may more efficiently perform trajectory evaluations and operational trajectory determinations using the techniques described herein because the disclosed examples may reduce the amount of data needed to represent candidate vehicle trajectories by reducing or eliminating the representation of objects and/or predicted object trajectories that may be irrelevant to candidate vehicle trajectories. Additionally, or alternatively, such resources may be used to improve predictions and other determinations that would have otherwise been dedicated to irrelevant objects. The disclosed examples may also reduce the amount of data needed to represent various types of data used to evaluate trajectories and reduce the amount of processing required to determine trajectories by representing occupancy data in an occupancy grid of state arrays as described herein that may be efficiently processed to determine object trajectory relevance. Furthermore, computing systems, such as vehicle computing systems, may more efficiently perform trajectory determination operations and the calculations required to determine an operational trajectory by maintaining relevant object trajectory data and not retaining irrelevant object trajectory data, thereby requiring fewer data storage resources and less processing to determine evaluate candidate trajectories and determine an operational trajectory than would be required using conventional techniques where an individual candidate trajectory may be associated with data represented any number of object trajectories that may not be relevant to the candidate trajectory.

The systems and techniques described herein can be implemented in a number of ways. Example implementations are provided below with reference to the following figures. Although the disclosed techniques may be discussed in the context of an autonomous vehicle, the techniques described herein can be applied to a variety of systems (e.g., a semi-autonomous vehicle, a manually operated vehicle, a sensor system, a robotic platform, etc.) and are not limited to autonomous vehicles. In another example, the techniques can be utilized in an aviation or nautical context, or in any system involving vehicle or object trajectories and/or deceleration control and/or implementation point determination operations. Further, although aspects of the disclosed systems and techniques may be discussed in the context of originating with particular types of sensor data and processing with particular types of components, data and data structures as described herein can include any two-dimensional, three-dimensional, or multi-dimensional data and data associated with any types of sensors (e.g., cameras, lidar, radar, sonar, time-of-flight, and the like). Additionally, the systems and techniques described herein can be used with real data (e.g., captured using sensor(s)), simulated data (e.g., generated by a simulator, training data, and the like) or any combination of thereof.

FIG. 1 is a pictorial flow diagram of an example process 100 for determining an operational trajectory for use in controlling a vehicle based on candidate trajectories and predicted object trajectory relevancy. In examples, one or more operations of the process 100 may be implemented by a vehicle computing system, such as by using one or more of the components and systems illustrated in FIGS. 6 and 7 and described below. For example, one or more components and systems can include those associated with vehicle computing system 604 illustrated in FIG. 6 and/or the computing system of vehicle 702, processors 716 and/or 740, memories 718 and/or 742, perception component 722, planning component 724, prediction component 734, and/or relevant object trajectory determination component 726 illustrated in FIG. 7. In examples, the one or more operations of the process 100 may be performed by a remote system in communication with a vehicle, such as perception component 744, planning component 746, and/or relevant object trajectory determination component 748 illustrated in FIG. 7. In still other examples, the one or more operations of the process 100 may be performed by a combination of a remote system and a vehicle computing system. However, the process 100 is not limited to being performed by such components and systems, and the components.

At operation 102, a vehicle computing system may identify objects and determine associated predicted trajectories. The vehicle computing system may detect objects within the environment based on sensor data. The vehicle computing system (e.g., one or more perception and/or prediction components configured therein) may also, or instead, determine one or more predicted trajectories for the detected objects. Examples of techniques for predicting trajectories for objects in an environment can be found, for example, in U.S. Pat. No. 11,169,531, issued Nov. 9, 2021, and titled "Trajectory Prediction on Top-Down Scenes," the contents of which is herein incorporated by reference in its entirety and for all purposes.

An example 104 illustrates a top-down view of an environment in which a vehicle 106 may be traveling. The vehicle 106 may be configured with a vehicle computing device configured to perform the relevancy filtering operations described herein. There may be several objects in the environment of example 104, including a vehicle 108, a vehicle 110, and a pedestrian 112. The vehicle 106 may detect these objects (vehicle 108, vehicle 110, and pedestrian 112) and determine (e.g., using a prediction component and/or relevant object trajectory determination component) one or more predicted object trajectories for the individual objects. These trajectories are represented in the example 104 as arrowed lines connected to the respective objects. For example, the vehicle 108 may have three predicted object trajectories, one associated with turning right, one associated with going straight and one associated with turning left. Vehicle 110 may have similar predicted object trajectories. Pedestrian 112 may also have predicted object trajectories that may include, for example, one for remaining on the sidewalk and two for crossing the street.

At operation 114, the vehicle computing system may determine one or more candidate trajectories for the vehicle. Of course, though described as trajectories herein, the description is not meant to be so limiting. In some examples, such alternates may broadly be associated with one or more actions that the vehicle is capable of performing at an instant in time. As noted, a candidate trajectory may include vehicle controls that may be implemented to control a vehicle along a planned path or route through an environment, to control a vehicle to reach an intended position or location in an environment (e.g., return to a drivable region from a non-drivable region, return to a planned path after getting off of the planned path, etc.), to control a vehicle around or to otherwise avoid an object or obstacle detected in an environment (e.g., avoid a dynamic object, avoid a static obstacle, etc.), etc. In various examples, the vehicle computing system may generate, receive, or otherwise determine several candidate vehicle trajectories (e.g., as may be determined based on environmental data including static and dynamic data, rules of the road, determination of reaching a desired destination, etc.). The vehicle computing system may determine from among such multiple candidate vehicle trajectories an operational trajectory based on various factors, include, but not limited to, those described herein. As a non-limiting example, various actions may be explored as part of a tree search and a resultant trajectory may be determined as an optimization over a determined trajectory resulting from the tree search (e.g., incorporating environmental constraints, modeling reactions of objects to the vehicle following such a trajectory, and the like).

An example 116 illustrated the environment of example 104 illustrating the vehicle 106 with three candidate vehicle trajectories (actions) indicated in arrowed lines. As shown in this example, the candidate trajectories may include a left turn trajectory, a straight trajectory, and a right turn trajectory. In various examples, such actions/trajectories may be associated with an index and given an order. In some such examples, the order may be from one side of a lane to the other. As such, the indices may be "0" for turning left, "1" for continuing straight, and "2" for turning right, though any other ordered system is contemplated.

At operation 118, the vehicle computing system may determine the relevance of the individual predicted object trajectories. For example, the vehicle computing system may determine an occupancy grid that the vehicle computing system may populate with occupancy data and pose data for the vehicle and individual objects and their associated predicted object trajectories, as described in more detail herein. The vehicle computing system may then determine relevancy scores representing the relevance of one or more predicted object trajectories to one or more candidate vehicle trajectories. The vehicle computing system may then, for the individual candidate vehicle trajectories, determine whether a relevancy score(s) for a particular predicted object trajectory indicates that the object trajectory is relevant to a candidate vehicle trajectory (also as described in more detail herein). If a predicted object trajectory is relevant to a candidate vehicle trajectory, at operation 118, the vehicle computing system may, at operation 120, associate (e.g., in a data structure) the relevant predicted object trajectory with the corresponding candidate vehicle trajectory. This association and/or the representative data structure may then be used to determine a resultant or operational trajectory (e.g., which may result from performing an optimization of all selected actions over a tree search).

Examples 122 and 124 illustrate relevant predicted object trajectories for two different candidate vehicle trajectories. In example 122, the left turn candidate vehicle trajectory (solid arrow) is shown for vehicle 106. The trajectories shown for the objects (vehicle 108, vehicle 110, and pedestrian 112) (dashed arrows) illustrate the predicted object trajectories that may be relevant to the left turn candidate vehicle trajectory for vehicle 106. As can be seen in this example, all three predicted object trajectories for the vehicle 108 from example 104 are shown as relevant to the left turn candidate vehicle trajectory for vehicle 106. This is because these trajectories individually raise a possibility of an intersection of vehicle 108 with vehicle 106 should vehicle 106 follow its left turn candidate vehicle trajectory. For vehicle 110, however, only its left turn and straight predicted object trajectories are relevant because if the vehicle 110 were to follow its right turn trajectory (shown in example 104), it may be very unlikely to intersect the vehicle 106 controlled along its left turn candidate vehicle trajectory. Likewise, only the predicted object trajectory that has the pedestrian 112 crossing the street onto which the vehicle 106 may be turning were it to follow its left turn candidate vehicle trajectory is relevant to that candidate vehicle trajectory.

Referring now to example 124, the straight candidate vehicle trajectory (solid arrow) is shown for vehicle 106. The trajectories shown for the objects (vehicle 108, vehicle 110, and pedestrian 112) (dashed arrows) illustrate the predicted object trajectories that may be relevant to the straight candidate vehicle trajectory for vehicle 106. As can be seen in this example, all three predicted object trajectories for the vehicle 110 from example 104 are shown as relevant to the straight turn candidate vehicle trajectory for vehicle 106. This is because these trajectories individually raise a possibility of an intersection of vehicle 108 with vehicle 106 should vehicle 106 follow its straight candidate vehicle trajectory. For vehicle 108, however, only its left turn predicted object trajectory is relevant because if the vehicle 110 were to follow its right turn trajectory or straight trajectory (shown in example 104), it may be very unlikely to intersect the vehicle 106 controlled along its straight candidate vehicle trajectory. Likewise, none of the predicted object trajectories associated with the pedestrian 112 are relevant to straight candidate vehicle trajectory for the vehicle 106.

At operation 126, based on the candidate vehicle trajectories, and those predicted object trajectories determined to be relevant thereto and/or any other factors that may be used to determine an operational trajectory, the vehicle computing system may determine an operational trajectory for the vehicle (e.g., a candidate trajectory that has been selected and is currently being executed). At operation 128, the vehicle computing system may control the vehicle through an environment based on this operational trajectory.

An example 130 illustrates the vehicle 106 being operated by using its straight candidate vehicle trajectory as its operational trajectory. As can be seen in this example, the vehicle 106 was operated to allow the vehicle 110 to cross in front of it (following its straight predicted object trajectory) and vehicle 108 remains stopped at the intersection. The pedestrian 112 have begun crossing the street, with no effect on the operational trajectory of the vehicle 106 (its straight candidate vehicle trajectory).

Figure 2:
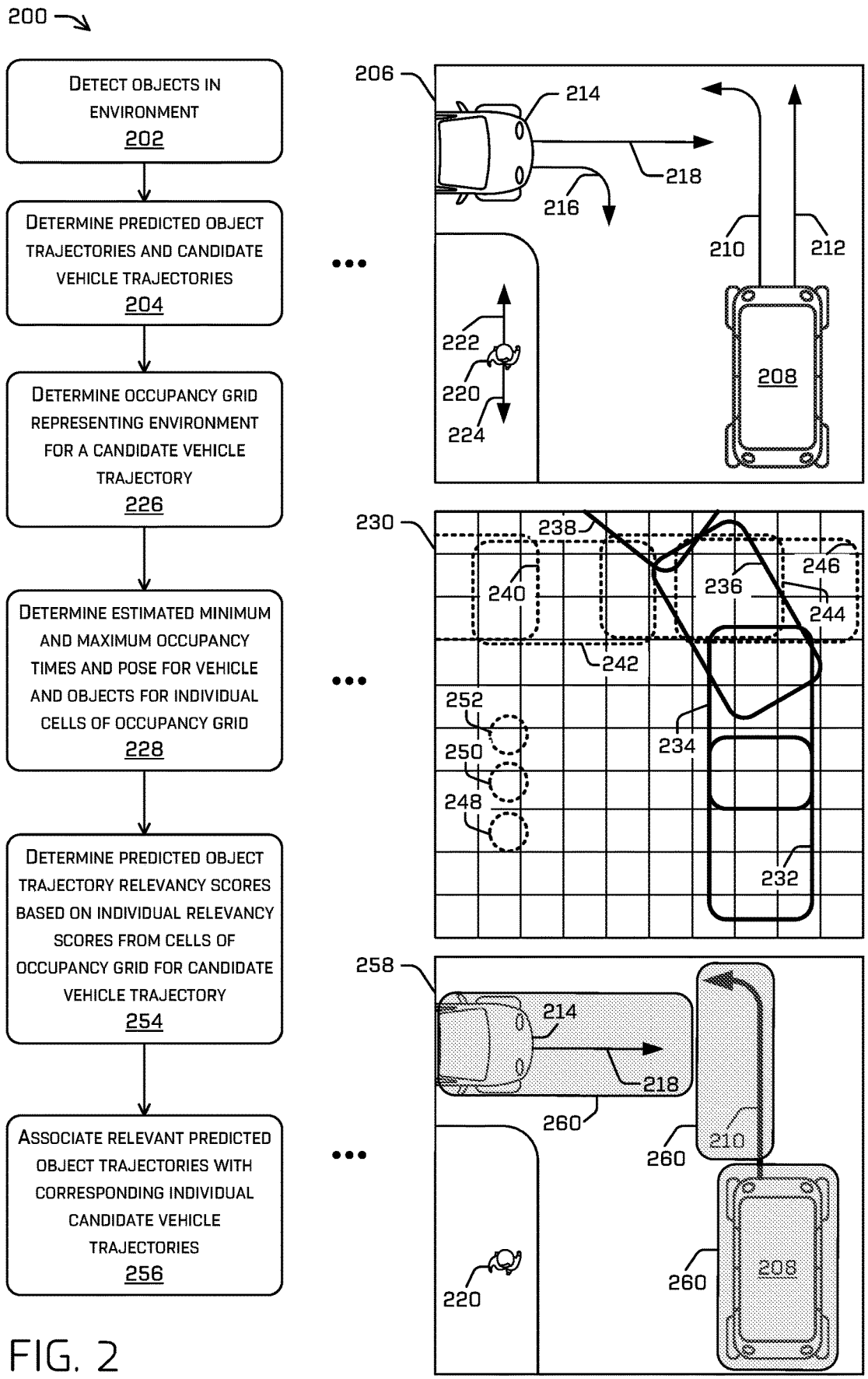
FIG. 2 is a pictorial flow diagram illustrating an example process for determining relevant object trajectories for candidate vehicle trajectories, in accordance with examples of the disclosure.

FIG. 2 is a pictorial flow diagram of an example process 200 for determining predicted object trajectory relevancy for a candidate vehicle trajectory using an occupancy grid. In examples, one or more operations of the process 200 may be implemented by a vehicle computing system, such as by using one or more of the components and systems illustrated in FIGS. 6 and 7 and described below. For example, one or more components and systems can include those associated with vehicle computing system 604 illustrated in FIG. 6 and/or the computing system of vehicle 702, processors 716 and/or 740, memories 718 and/or 742, perception component 722, planning component 724, prediction component 734, and/or relevant object trajectory determination component 726 illustrated in FIG. 7. In examples, the one or more operations of the process 200 may be performed by a remote system in communication with a vehicle, such as perception component 744, planning component 746, and/or relevant object trajectory determination component 748 illustrated in FIG. 7. In still other examples, the one or more operations of the process 200 may be performed by a combination of a remote system and a vehicle computing system. However, the process 200 is not limited to being performed by such components and systems, and the components.

At operation 202, a vehicle computing system configured at a vehicle traversing an environment may detect objects in the environment, for example, using sensor data acquired or determined by one or more sensor systems. This sensor data may include image data, radar data, lidar data, etc. The vehicle computing system may use this sensor data to detect and classify various objects within an environment in which the vehicle may be operating.

At operation 204, the vehicle computing system may determine (e.g., using a prediction component) one or more predicted object trajectories for individual objects detected in the environment. The vehicle computing system may also, or instead, determine (e.g., using a planning component, received from a remote system, etc.) one or more candidate vehicle trajectories for the vehicle.

An example 206 illustrates an environment in which a vehicle 208 may be traveling. The vehicle 208 (e.g., a vehicle computing system configured therein) may detect and/or classify the vehicle 214 in the environment as well as the pedestrian 220. The vehicle 208 may further determine predicted object trajectories 216 and 218 for the detected vehicle 214, along with determine predicted object trajectories 222 and 224 for the detected pedestrian 220. The vehicle 208 may also determine candidate vehicle trajectories 210 and 212 as candidate operational trajectories for the vehicle 208.

At operation 226, the vehicle computing system may determine an occupancy grid for a particular candidate vehicle trajectory representing a portion of the environment in which the vehicle is traveling. In examples, the occupancy grid may represent an area of the environment in which a vehicle is capable of traveling within a given amount of time for which the vehicle is configured to make determinations and plan control (e.g., its "decision horizon"). For example, the occupancy grid may be a square area of the environment of a length and width twice the distance that the vehicle may travel within a given time at a current (or other determined) speed and acceleration from its current position, speed, and acceleration (regardless of whether such travel is actually feasible, e.g., included non-drivable regions). For example, if the vehicle is capable of traveling 20 meters from its current position in 8 seconds, the occupancy grid may be a 40 meter by 40 meter square. The occupancy grid may be divided into cells of any size. To continue the example, the 40 meter by 40 meter occupancy grid may be divided into 4 meter by 4 meter cells. In those examples in which a sequence of decisions is made, one or more individual occupancy grids may be utilized for each period of time between successive timesteps up to a given time horizon (e.g., 2s, 5s, 8s, etc.).

At operation 228, the vehicle computing system may determine a minimum and a maximum occupancy time for objects and the vehicle for individual cells of the occupancy grid based on the associated trajectories. For example, the vehicle computing system may determine, for an individual cell of the occupancy grid, whether the vehicle will occupy the portion of the environment represented by that cell at any time during the time period if it follows the candidate vehicle trajectory associated with the occupancy grid. In particular, the vehicle computing system may determine an earliest, or minimum, occupancy time that the vehicle may enter the portion of the environment associated with that cell based on various factors (e.g., vehicle dynamics such as vehicle maximum acceleration, velocity, heading, etc.). The vehicle computing system may also, or instead, determine a latest, or maximum, occupancy time at which the vehicle may be present in the portion of the environment associated with that cell based on various factors (e.g., vehicle dynamics such as vehicle maximum deceleration, reduction in velocity, heading, etc.). The vehicle computing system may also determine a pose (e.g., heading and position) for the vehicle following the candidate vehicle trajectory at that cell.

Further at operation 228, the vehicle computing system may determine, for an individual cell of the occupancy grid, whether an object associated with a particular predicted object trajectory will occupy the portion of the environment represented by that cell at any time if it follows that predicted object trajectory. In particular, the vehicle computing system may determine an earliest, or minimum, occupancy time that the object following the predicted object trajectory may enter the portion of the environment associated with that cell based on various factors (e.g., predicted object dynamics such as predicted object maximum acceleration, velocity, heading, etc.). The vehicle computing system may also, or instead, determine a latest, or maximum, occupancy time at which the object following the predicted object trajectory may be present in the portion of the environment associated with that cell based on various factors (e.g., predicted object dynamics such object maximum deceleration, velocity, heading, etc.). The vehicle computing system may also determine a predicted pose (e.g., heading and position) for the object following the predicted object trajectory at that cell.

The determinations made at 228 may be stored as arrays of states. Individual cells in an occupancy grid may be associated with a single array of states. An individual state in an array may represent occupancy times and pose data for a particular object associated with a particular predicted object trajectory or a vehicle associated with a candidate vehicle trajectory associated with the occupancy grid. In such examples, an index or flag may be associated with the particular object or vehicle associated with the cell.

FIG. 2 illustrates an example occupancy grid 230 and various example predicted occupancies and poses for the vehicle 208 and the objects (vehicle 214 and pedestrian 220) of example 206. The dashed outlined shapes in the occupancy grid 230 represent the predicted positions and poses of the vehicle 214 and pedestrian 220 while the solid outline shapes in the occupancy grid 230 represent the predicted positions and poses of the vehicle 208 as it is controlled along a candidate vehicle trajectory that may be associated with the occupancy grid 230, all of which during the time period and in accordance with a maximum and minimum acceleration during the time period.

For example, the solid outlines 232, 234, 236, and 238 may represent the position of the vehicle 208 as it traverses the environment controlled according to the candidate vehicle trajectory 210 of example 206. For instance, the solid outlines 232, 234, 236, and 238 may represent vehicle positions at a particular point in time (e.g., two second increments). The dashed outlines 240, 242, 244, and 246 may similarly represent the positions of the vehicle 214 as it is predicted to traverse the environment based on the predicted object trajectory 218 of example 206. Here again, the dashed outlines 240, 242, 244, and 246 may represent the object position at a particular point in time (e.g., subsequent two second increments). The dashed outlines 248, 250, and 252 may similarly represent the positions of the pedestrian 220 as the pedestrian is predicted to traverse the environment based on the predicted object trajectory 222 of example 206. Here again, the dashed outlines 248, 250, and 252 may represent the pedestrian position at a particular point in time (e.g., 248, 250, and 252 two second increments). Note that the information associated with these outlines may be stored as states in arrays of state data associated with individual cells of the occupancy grid 230.

The vehicle computing system of the vehicle 208 may determine whether and how long the vehicle 208 and the objects (vehicle 214 and pedestrian 220) are predicted to occupy the cells of the occupancy grid. In this example, the outlines illustrate the positions that the various objects and the vehicle will occupy based on the predicted object trajectories and the candidate vehicle trajectory associated with the occupancy grid. As can be seen in this example, at least some of the outlines of the vehicle 208 overlap with outlines of the vehicle 214 (e.g., vehicle outline 234 overlaps object outlines 244 and 246, vehicle outline 236 overlaps object outlines 242, 244, and 246, and vehicle outline 238 overlaps object outlines 242, 244, and 246). This indicates that the vehicle 214 and the vehicle 208 may occupy the same portions of the environment at the same time (e.g., intersect) if the predicted object trajectory for the vehicle 214 and the candidate vehicle trajectory 210 associated with the occupancy grid 230 are followed. This illustrates that the predicted object trajectory 218 may be relevant to the candidate vehicle trajectory 210.

Note, however, that the dashed outlines 248, 250, and 252 representing the pedestrian 220 along its predicted object trajectory 222 do not overlap any of the outlines associated with the vehicle 208. This illustrates that, for at least the time period associated with the occupancy grid 230, the pedestrian traveling along the predicted object trajectory 222 is unlikely to intersect with the vehicle 208 traveling according to the candidate vehicle trajectory 210 associated with the occupancy grid 230. Hence, the predicted object trajectory 222 may not be relevant to the candidate vehicle trajectory 210.

At operation 254, relevancy determinations may be made based on the data determined for an occupancy grid at operation 228. In various examples, a relevancy score may be determined for pairs of states in individual arrays associated with individual cells of the occupancy grid. Using these relevancy scores for pairs of states, an aggregated relevancy score may be determined for individual combinations of a particular predicted object trajectory and a candidate vehicle trajectory. For example, an aggregated relevancy score may be determined based on individual relevancy scores for a particular predicted object trajectory determined for individual cells of an occupancy grid associated with a particular candidate vehicle trajectory. Details of various techniques for determining individual relevancy scores and aggregated relevancy scores are described in more detail in regard to FIG. 3.

At operation 256, the vehicle computing system may determine whether one or more of the predicted object trajectories represented in an occupancy grid are sufficiently relevant to the candidate vehicle trajectory associated with the occupancy grid. This may be determined based on a relevancy threshold or a minimum required relevancy. For example, the vehicle computing system may determine whether an aggregated relevancy score for a particular predicted object trajectory meets or exceeds a relevancy threshold value. Alternatively, or in addition, a vehicle computing system may determine that any non-zero aggregated or individual relevancy score indicates that the associated predicted object trajectory is relevant (e.g., to ensure the safest possible operation of the vehicle).

An example 258 illustrates the relevant objects and trajectories that may be associated with the candidate vehicle trajectory 210 introduced in the example 206. As shown, based on the occupancy grid 230, the vehicle computing system may determine that the shaded portion 260 represent features of the environment of the example 206 that may be relevant to the trajectory 210. As shown here, the vehicle 214 and its trajectory 218 are included with the vehicle 208 and the candidate vehicle trajectory 210 as relevant portions 260. However, neither the pedestrian nor any of its trajectories are included as relevant portions 260.

Figure 3:
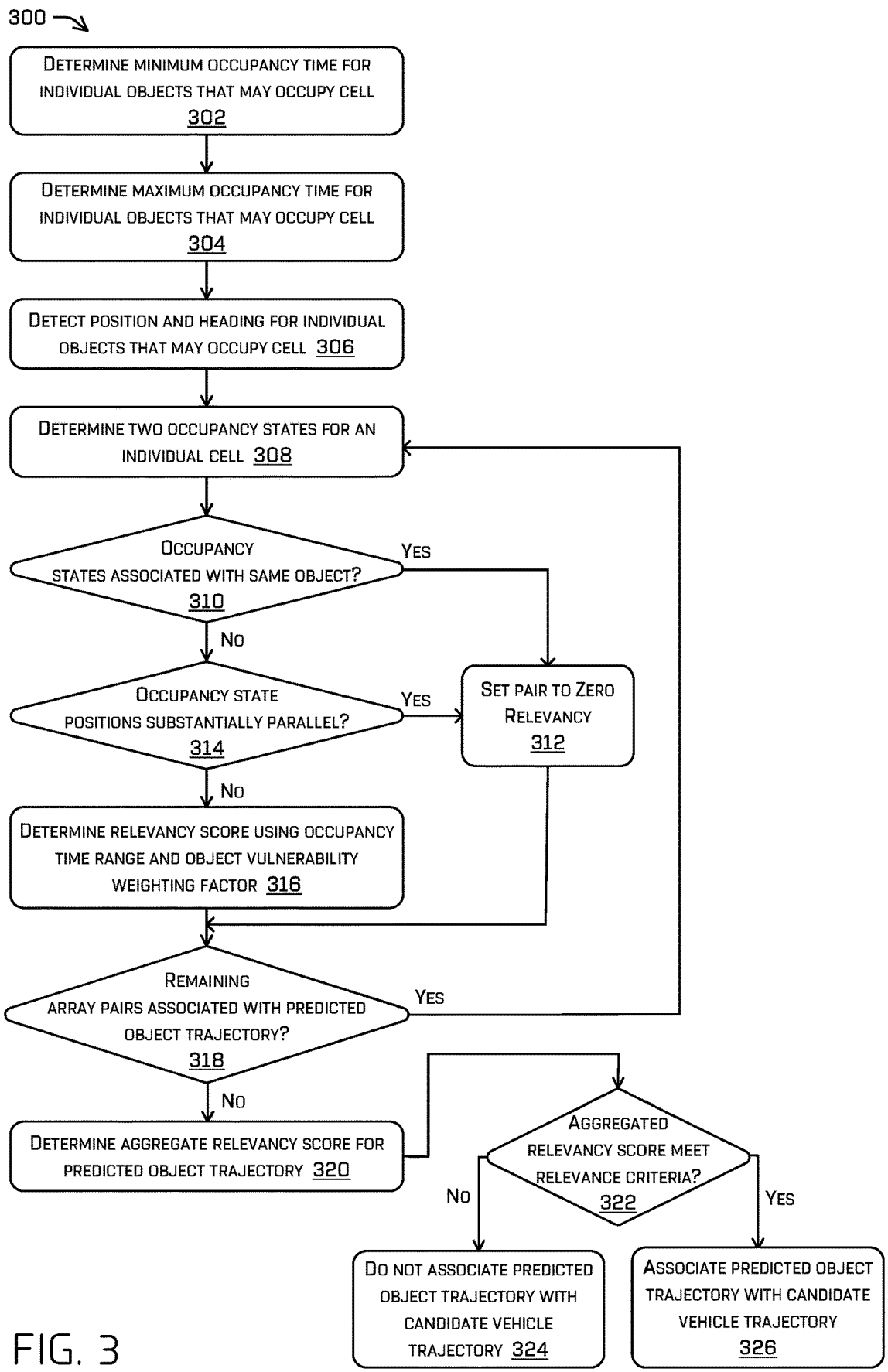
FIG. 3 a flow diagram illustrating an example process for determining object trajectory relevance to a candidate vehicle trajectory, in accordance with examples of the disclosure.

FIG. 3 is flow diagram of an example process 300 for determining the relevance of a predicted object trajectory to a candidate vehicle trajectory. In examples, one or more operations of the process 300 may be implemented by a vehicle computing system, such as by using one or more of the components and systems illustrated in FIGS. 6 and 7 and described below. For example, one or more components and systems can include those associated with vehicle computing system 604 illustrated in FIG. 6 and/or vehicle computing device 704, processors 716 and/or 740, memories 718 and/or 742, perception component 722, planning component 724, prediction component 734, and/or relevant object trajectory determination component 726 illustrated in FIG. 7. In examples, the one or more operations of the process 300 may be performed by a remote system in communication with a vehicle, such as perception component 744, planning component 746, and/or relevant object trajectory determination component 748 illustrated in FIG. 7. In still other examples, the one or more operations of the process 300 may be performed by a combination of a remote system and a vehicle computing system. However, the process 300 is not limited to being performed by such components and systems, and the components.

At operation 302, a vehicle computing system may determine, for a particular object associated with a particular predicted object trajectory, a minimum, or earliest, occupancy time that the object may occupy a portion of an environment represented by a cell in an occupancy grid. The minimum occupancy time may be an estimate of the earliest time from a current time that an object may occupy the portion of the environment represented by the cell. In various examples, this object may be an object in the environment detected by a vehicle or the vehicle itself. The resulting determined minimum occupancy time may be stored as a component of a state in an array of states associated with the corresponding cell. The state may be associated with the object and its trajectory (e.g., a detected object and its predicted object trajectory or a vehicle and the candidate vehicle trajectory associated with the occupancy grid).

The maximum (e.g., estimated) acceleration of the object (e.g., vehicle or detected object) may be used to determine the minimum occupancy time. To determine the minimum occupancy time, a critical arclength $\overline{S}$ may be determined using the velocity v(max–maximum and 0–initial) of the object and the maximum acceleration a as shown in equation (1).

$$\overline{S} = \frac{v_{max}^2 - v_0^2}{2a_{max}} \tag{1}$$

By assuming a constant maximum acceleration of the object, the velocity may be determined using equation (2).

$$v_t = \sqrt{v_0^2 + 2a_{max}s} = v_0 + a_{max}t_{min} \tag{2}$$

Equation (2) may yield equation (3) for the minimum occupancy time $t_{min}$.

$$t_{min} = \frac{\sqrt{v_0^2 + 2a_{max}^s} - v_0}{a_{max}} \tag{3}$$

Assuming the object accelerates to the maximum velocity and remains at the maximum velocity until to arrives at the portion of the environment represented by the cell, the minimum occupancy time $t_{min}$ may then be determined using equation (4).

$$t_{min} = \frac{v_{max} - v_0}{a_{max}} + \frac{s - \bar{s}}{v_{max}} \quad (4)$$

At operation 304, a vehicle computing system may determine, for a particular object associated with a particular predicted object trajectory, a maximum, or latest, occupancy time that the object may occupy the portion of the environment represented by the cell in the occupancy grid. The maximum occupancy time may be an estimate of the latest time from a current time that an object may occupy the portion of the environment represented by the cell. Here again, this object may be an object in the environment detected by a vehicle or the vehicle itself. The resulting determined maximum occupancy time may be stored as a component of a state a state in an array of states associated with the corresponding cell. The state may be associated with the object and its trajectory (e.g., a detected object and its predicted object trajectory or a vehicle and the candidate vehicle trajectory associated with the occupancy grid).

The maximum (e.g., estimated) deceleration of the object (e.g., vehicle or detected object) may be used to determine the maximum occupancy time. To determine the maximum occupancy time, a critical threshold arclength 5 may be determined using the current velocity v of the object and the minimum acceleration a (e.g., maximum deceleration) as shown in equation (5).

$$\bar{s} = \frac{v^2}{2a_{min}} \quad (5)$$

For a given s smaller than the threshold arclength, the velocity may be given as shown in equation (6):

$$v_t = v_0^2 + 2a_{min}s = v_0 + a_{min}t_{max} \quad (6)$$

which may yield equation (7) for maximum occupancy time:

$$t_{max} = \frac{\sqrt{v_0^2 + 2a_{min}s} - v_0}{a_{min}} \quad (7)$$

For any arclength larger than the critical threshold arclength, the maximum occupancy time may theoretically be a maximum occupancy time of infinity.

At operation 306, the vehicle computing system may determine, for a particular object associated with a particular predicted object trajectory, a (e.g., predicted and/or estimated) pose (e.g., a heading and position) of the object when the object occupies the portion of the environment represented by the cell in an occupancy grid. The position of the object or vehicle may be determined using one or more prediction components, detection components, and/or classification components. For example, pose information may be determined for objects detected in the environment based on sensor data, while a localization component may determine pose information for the vehicle.

At operation 308, the vehicle computing system may determine two states associated with an individual cell to compare for relevancy determination purposes. In various examples, the vehicle computing system may compare the individual states to one another (e.g., compare individual states to every other state in a cell's state array) while in other examples the vehicle computing system may determine to compare only selected cells based on one or more criteria.

At operation 310, the vehicle computing system may determine whether the two selected states are associated with a same object (e.g., both states are associated with the vehicle or both states are associated with the same detected object). If both states are associated with a same object, at operation 312 the vehicle computing system may assign the pair of states a relevancy score of zero or null as being irrelevant to the candidate vehicle trajectory associated with the occupancy grid. This assignment may be due to the inability of an object to interfere with itself.

If, at operation 310, the vehicle computing system determines that the two selected states are not associated with a same object, at operation 314 the vehicle computing system may determine if the poses of the object (e.g., the headings) indicate that the objects are traveling substantially parallel to one another (e.g., within 5 degrees, 1 degree, or the like). If both states indicate substantially parallel directions of travel, at operation 312 the vehicle computing system may assign the pair of states a relevancy score of zero or null as being irrelevant to the candidate vehicle trajectory associated with the occupancy grid. This assignment is due to the unlikelihood of two objects traveling parallel to one another to interfere with one another.

If, at operation 314, the vehicle computing system determines that the two selected states do not indicate that the objects are traveling substantially parallel to one another, at operation 316, the vehicle computing system may determine a relevancy score for the pair of states. This relevancy score may be determined by comparing the occupancy times and time ranges for the two state. For example, a first state may be represented as $(t_{0,min}, t_{0,max}, x_0, y_0, \theta_0)$ while a second state may be represented as $(t_{1,min}, t_{1,max}, x_1, y_1, \theta_1)$, where $x_0$, y, and $\theta$ indicate a position and heading, respectively, and $t_{min}$ and $t_{max}$ represent the minimum and maximum occupancy times, respectively.

If a minimum occupancy time for one state is later than a maximum occupancy time for another, than the first state is necessarily irrelevant to the second state. For example, if $w_{i,j}$ represents a relevance score indicating the relevance of a trajectory i to a trajectory j, $w_{i,j}=0$ if $t_{i,min}>t_{j,max}$. Otherwise, the relevance score may be determined using equation (8), where a may be a weighting factor that may be used to weight relevance scores based on the "vulnerability" of the associated object.

$$w_{i,j} = \exp(-\alpha_i t_{i,min} - \alpha_j t_{j,min}) \in [0,1] \quad (8)$$

For example, a pedestrian may be more vulnerable to damage from intersecting with a vehicle than another vehicle. A larger, heavier vehicle, sch as a bus or tractor-trailer, may be less vulnerable to damage from a vehicle than a typical car. Likewise a vehicle that is implementing the disclosed systems and methods may be more vulnerable in an interaction with a truck or bus than in an interaction with a motorcycle or bicycle. In at least some examples, such weighting factor may range from approximately 0.1 to 0.2.

Figure 4:
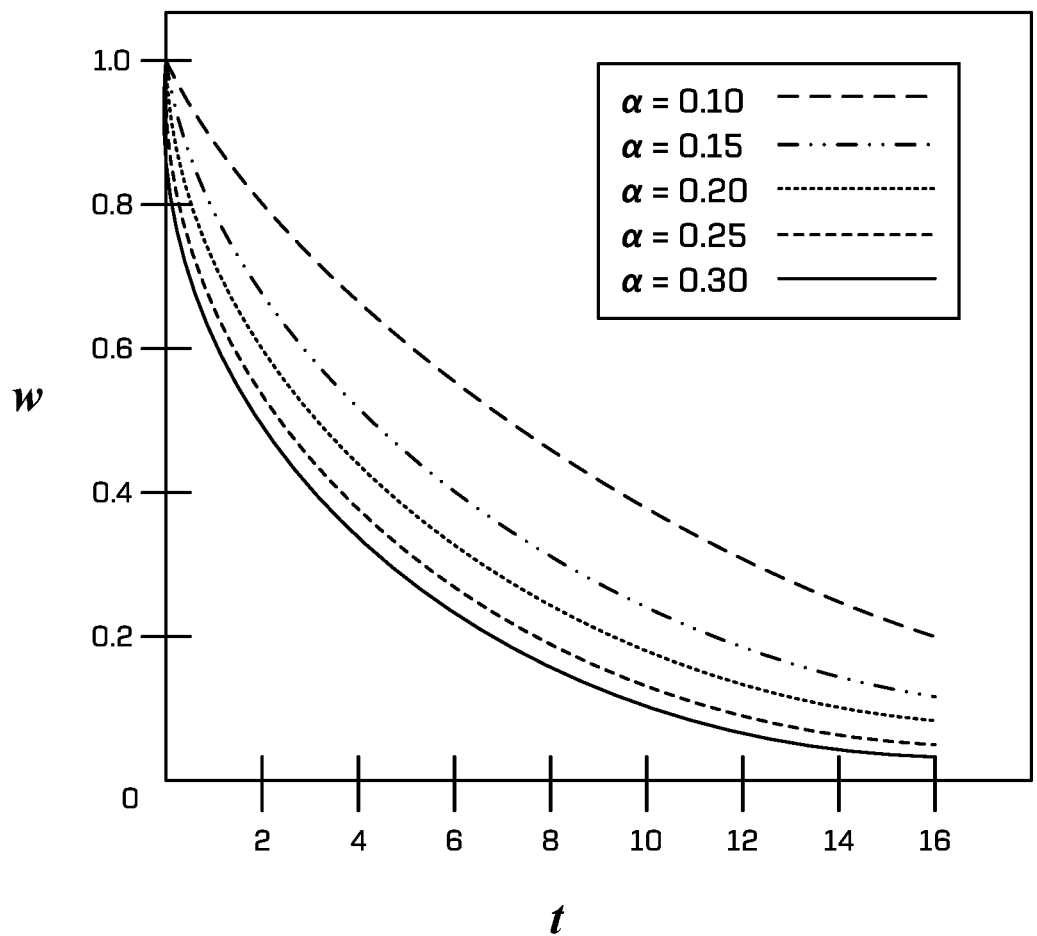
FIG. 4 is a graphical representation of the effects of various weighting values that may be applied to object trajectory relevancy scores, in accordance with examples of the disclosure.

Referring now to FIG. 4, a graphical representation 400 is provided illustrating the effects of various choices of vulnerability weighting factors $\alpha$. As can be seen here, a smaller weighing factor (e.g., $\alpha=0.10$) may be used for more vulnerable object types as the smaller weighting factor causes the relevancy score w to decrease more slowly and remain higher than a higher weighing factor (e.g., α=0.30). The vehicle computing system may be configured to select a weighting factor for an object and/or its associated predicted object trajectory (or a vehicle and its associated candidate vehicle trajectory) based on a type of the object and/or a vulnerability of the object relative to the comparison object (e.g., compared to the vehicle associated with the candidate vehicle trajectory associated with the occupancy grid).

Returning now to FIG. 3, at operation 318 the vehicle computing system may determine whether there are remaining array pairs and/or cells in an occupancy grid associated with a particular predicted object trajectory for which individual relevancy scores are to be determined. If so, the process 300 may return to operation 308 to perform another individual relevancy score determination operation as described above.

If there are no further individual relevancy score determinations to perform for a particular predicted object trajectory represented in an occupancy grid associated with a candidate vehicle trajectory, at operation 320, the vehicle computing system may determine an aggregate relevancy score for the particular predicted object trajectory indicating its relevance to the candidate vehicle trajectory associated with the occupancy grid. In examples, the vehicle computing system may determine an aggregated relevancy score by averaging the relevancy scores across the occupancy grid for that predicted object trajectory. In other examples, the vehicle computing system may average the non-zero relevancy scores across the occupancy grid for that predicted object trajectory. In still other examples, the vehicle computing system may average all (e.g., zero and non-zero) relevancy scores across the occupancy grid for that predicted object trajectory. In still other examples, the aggregated relevancy score for a predicted object trajectory may be set to the highest relevancy score associated with the predicted object trajectory across the occupancy grid to ensure that any relevancy is accounted for in determining an operational trajectory for a vehicle.

At operation 322, the aggregated relevancy score may be evaluated to determine if the associated predicted object trajectory is relevant to the candidate vehicle trajectory associated with the occupancy grid. In examples, a threshold value may be used to determine relevance and any aggregated relevancy score that meets or exceeds the threshold value may indicate that the associated predicted object trajectory is relevant to the corresponding candidate vehicle trajectory. In some examples, this threshold may be based on one or more of various criteria. In particular examples, the threshold may be zero, ensuring that any potentially intersecting objects are considered in determining an operational trajectory.

If the relevance criteria of operation 322 are met, the predicted object trajectory may be associated with the candidate vehicle trajectory at operation 326 and used in determining whether the candidate vehicle trajectory is to be used as an operational trajectory. Otherwise, it the relevance criteria of operation 322 are not met, the predicted object trajectory may not be associated with the candidate vehicle trajectory at operation 324 and/or otherwise excluded from use in determining whether the candidate vehicle trajectory is to be used as an operational trajectory. This may save processing and data storage resources, increasing efficiency of a vehicle computing system by not wasting resources on irrelevant predicted object trajectories.

Figure 5:
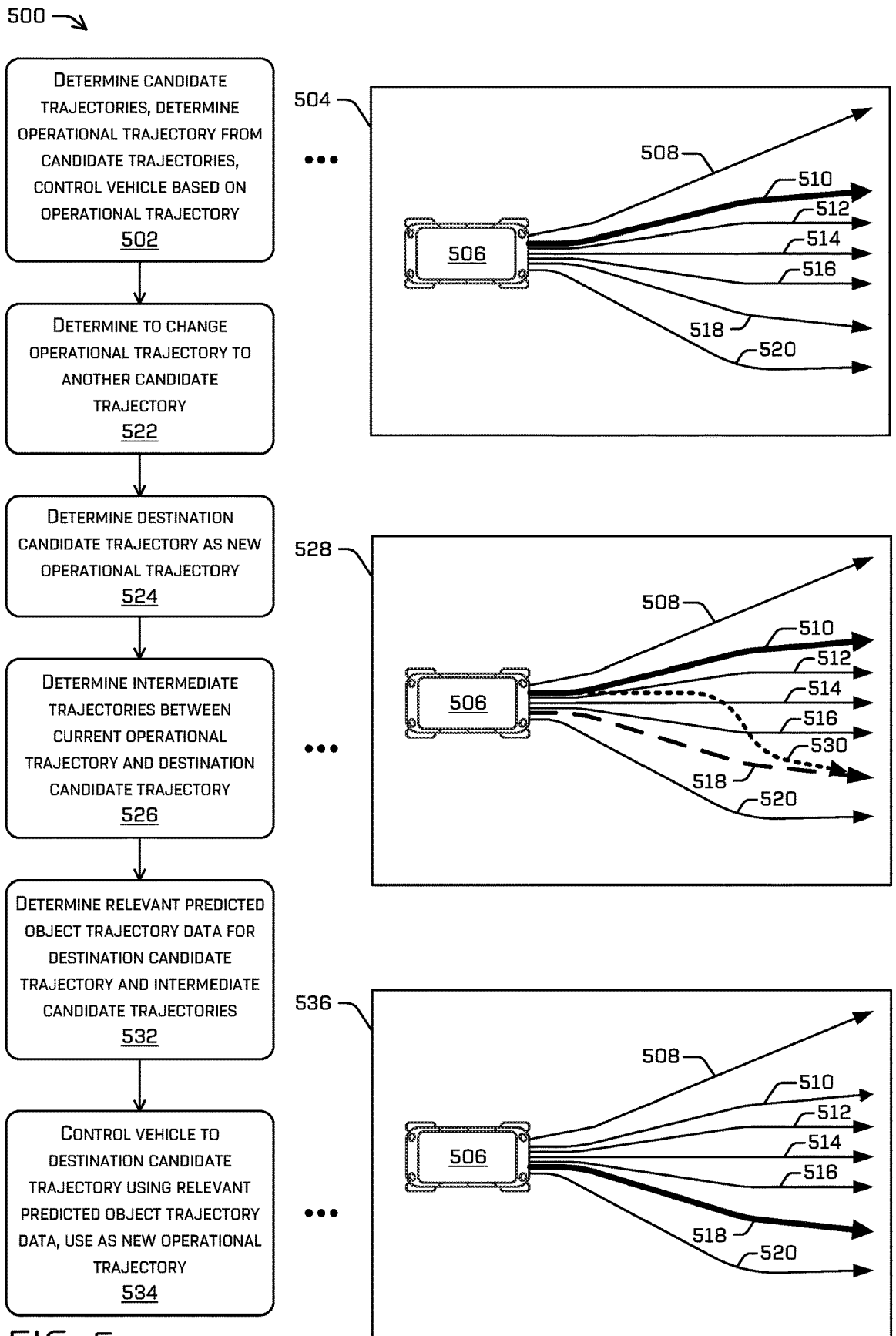
FIG. 5 is a pictorial flow diagram illustrating an example process for determining relevant objects for candidate vehicle trajectories while shifting operational trajectories, in accordance with examples of the disclosure.

FIG. 5 is a pictorial flow diagram of an example process 500 for determining relevancy scores for predicted object trajectories associated with intermediate candidate trajectories when switching between candidate vehicle trajectories serving as a basis for an operational trajectory. In examples, one or more operations of the process 500 may be implemented by a vehicle computing system, such as by using one or more of the components and systems illustrated in FIGS. 6 and 7 and described below. For example, one or more components and systems can include those associated with vehicle computing system 604 illustrated in FIG. 6 and/or vehicle computing device 704, processors 716 and/or 740, memories 718 and/or 742, perception component 722, planning component 724, prediction component 734, and/or relevant object trajectory determination component 726 illustrated in FIG. 7. In examples, the one or more operations of the process 500 may be performed by a remote system in communication with a vehicle, such as perception component 744, planning component 746, and/or relevant object trajectory determination component 748 illustrated in FIG. 7. In still other examples, the one or more operations of the process 500 may be performed by a combination of a remote system and a vehicle computing system. However, the process 500 is not limited to being performed by such components and systems, and the components.

At operation 502, a vehicle computing device may determine one or more candidate vehicle trajectories/actions for a vehicle that may be traveling in an environment. Candidate trajectories may be determined by a planning component, for example, as described herein. In examples, data such as mapping data, remote instructions, static and/or dynamic object detections, lane detections, current vehicle pose (e.g., heading and position), current vehicle location, etc., may be used to generate a candidate vehicle trajectory. In various examples, one or more baseline candidate vehicle trajectories may be determined, and one or more associated candidate vehicle trajectories may be determined based on the baseline candidate vehicle trajectory by applying one or more lateral offsets to the baseline candidate vehicle trajectory to generate an associated candidate vehicle trajectory.

A vehicle computing system may be configured to determine candidate trajectories regularly or otherwise on a schedule. For example, the vehicle computing system may be configured to determine one or more candidate vehicle trajectories (e.g., based on available data) at regular time increments (e.g., trajectory determination time increments that may be, for example, every second, 500 milliseconds, 250 milliseconds, 100 milliseconds, 50 milliseconds, etc.). In various examples, such regular time increments may be used as decision nodes in expanding a tree search for determination of the trajectory. Alternatively or additionally, the vehicle computing system may be configured to determine one or more candidate trajectories based on detecting one or more conditions (e.g., detecting an obstacle, receiving user instructions, etc.). The vehicle computing system may be configured to determine any number of candidate vehicle trajectories based on a variety of factors and criteria. The candidate vehicle trajectories determined at operation 502 may include or otherwise be associated with one or more relevant predict object trajectories as described herein.

The vehicle computing system may determine a particular trajectory from among the currently available candidate trajectories for use as an operational trajectory to control the vehicle (e.g., at least until the next trajectory determination time increment). The vehicle computing system may also be configured to determine the operational trajectory at trajectory determination time increments. Further at operation 502, the vehicle computing system may determine an operational trajectory from among the available candidate trajectories and control the vehicle based on that trajectory. Still further, in additional or alternate examples, a resultant trajectory which is determined based on optimization over a tree search (e.g., the resultant trajectory for minimizing a cost associated with following a series of actions at subsequent time steps) may be determined and/or further refined based on additional optimizations, processing, simulations, etc.

An example 504 illustrates a vehicle 506 that may currently have several candidate vehicle trajectories available. The trajectories 508, 510, 512, 514, 516, 518, and 520 may be candidate trajectories determined by a vehicle computing system associated with the vehicle 506. The vehicle computing system may have determined to use the candidate trajectory 510 (in bold in the example 504) as the current operational trajectory for the vehicle 506. As shown in this example, candidate vehicle trajectories may be ordered from the vehicle left to right (e.g., sequentially from 508 as the leftmost trajectory for the vehicle 506 to 520 as the rightmost trajectory) facilitate determining relevant object and object trajectories in the event an operational trajectory switch is implemented, as described below.

In examples, the vehicle computing system may determine that the candidate vehicle trajectory serving as the basis for the operational trajectory may need to change, e.g. from one time step to a subsequent timestep. For example, the vehicle computing system may detect a condition that makes using the current basis trajectory as the operational trajectory unsafe or otherwise undesirable. For instance, the vehicle computing system may determine that the vehicle has entered a non-drivable region of the environment (e.g., an expected drivable region is now under construction) or an unexpected obstacle has appeared in the path of the vehicle (e.g., a bicyclist has entered the street in front of the vehicle). When this occurs at a time period between trajectory determination time increments, the vehicle computing system may be configured to control the vehicle so that it moves from tracking along the current operational trajectory to tracking another trajectory that will then serve as the operational trajectory.

At operation 522, the vehicle computing system may make such a determination, for example, that a different candidate trajectory is to be used as the operational trajectory (e.g., based on one or more condition as described above). At operation 524, the vehicle computing system may determine the new candidate vehicle trajectory as a destination trajectory to be used as the operational trajectory once the vehicle is in a position associated with that destination trajectory.

In order to position the vehicle such that it may begin using the destination trajectory as the operational trajectory, the vehicle computing system may have to control the vehicle across portions of the environment that may be associated with one or more other candidate trajectories. At operation 526, the vehicle computing system may determine the candidate trajectories that are laterally between the current candidate trajectory serving as a basis for the operational trajectory and the destination candidate trajectory intended to servs as the next basis for the operational trajectory.

An example 528 illustrates the trajectories of the example 504. In this example, the vehicle computing system may have determined (e.g., between trajectory determination time increments) that the trajectory 510 is not a safe and/or efficient trajectory for current use as an operational trajectory (e.g., an obstacle may have entered the region along trajectory 510). The vehicle computing system may further determine that trajectory 518 is the preferred candidate vehicle trajectory (destination trajectory) for use as a basis for the operational trajectory. Thus, the vehicle computing system may control the vehicle to move from a position along the trajectory 510 to a position along the trajectory 518. This movement is illustrated as temporary tracking trajectory 530 in example 528. As can be seen in this example, following the temporary tracking trajectory 530 to position the vehicle 506 along the trajectory 518 will require the vehicle crossing the paths of the trajectories 512, 514, and 516. Accordingly, to maintain safe and comfortable control of the vehicle, the vehicle computing system may determine relevant predicted object trajectory data for the relevant predicted object trajectories associated with trajectories 512, 514, and 516. As the vehicle computing system will be using the destination candidate vehicle trajectory 518 as the operational trajectory, the vehicle computing system may also determine relevant predicted object trajectories associated with that trajectory.

At operation 532, the vehicle computing system may determine one or more relevant predicted object trajectories associated with the individual intermediate candidate vehicle trajectories located laterally between the candidate vehicle trajectory serving as the current operational trajectory and the destination candidate vehicle trajectory intended as the new operational trajectory. Also at operation 532, the vehicle computing system may determine one or more relevant predicted object trajectories associated with the destination trajectory.

At operation 534, the vehicle computing system may use the determined relevant predicted object trajectories and/or associated data for the intermediate trajectories and the destination trajectory to safely control the vehicle to a position along the destination trajectory. The vehicle computing system may then begin using the destination candidate vehicle trajectory as the operational trajectory.

An example 536 illustrates the trajectories of the example 504 again. In this example, the vehicle computing system may have determined (e.g., between trajectory determination time increments) the relevant predicted object trajectory data for the relevant predicted object trajectories associated with intermediate trajectories 512, 514, and 516 and destination trajectory 518. Using this predicted object trajectory data, the vehicle computing system may have controlled the vehicle 506 to a position associated with the destination candidate vehicle trajectory 518 and may begin using the trajectory 518 as the bases for the vehicle 506's operational trajectory.

Figure 6:
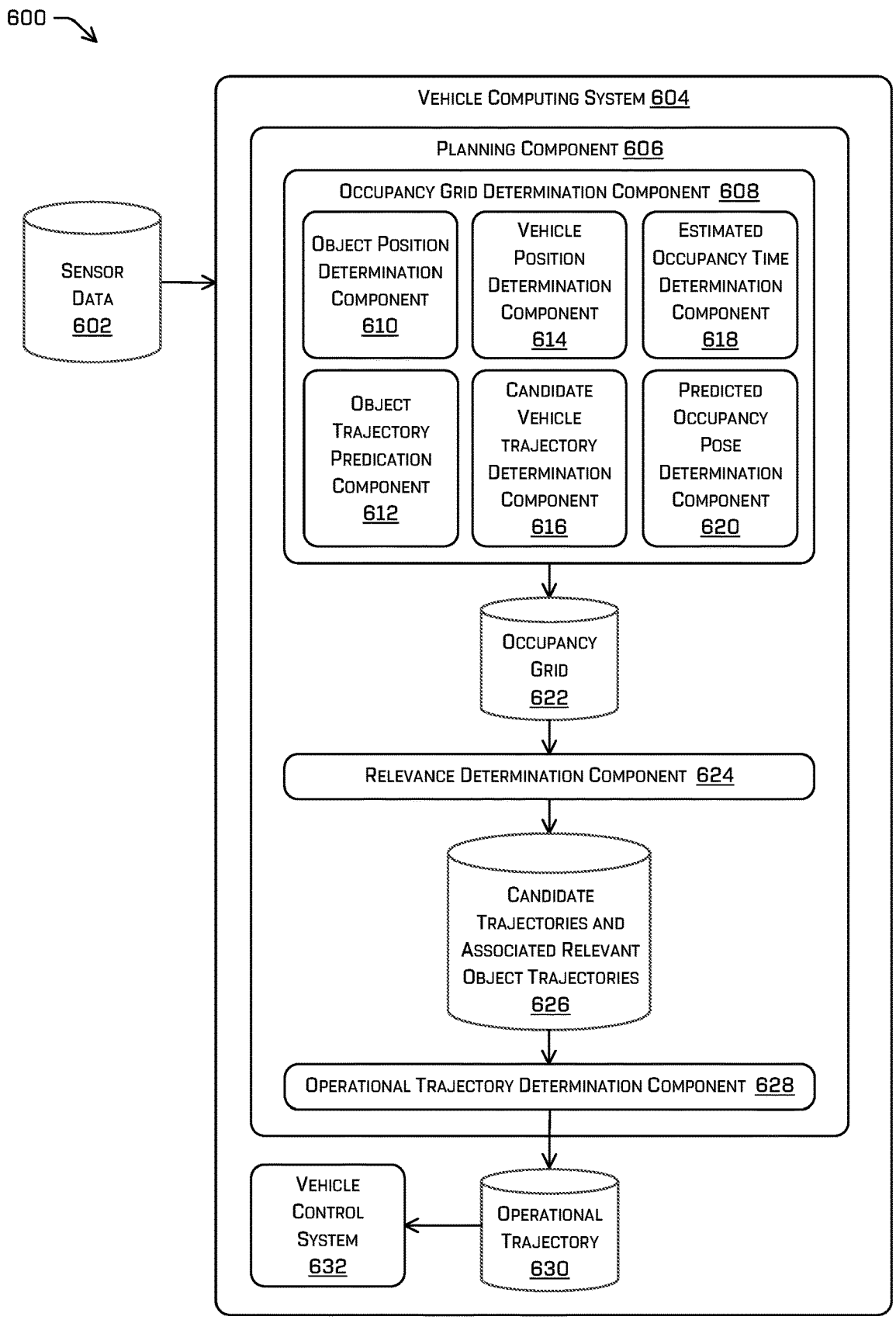
FIG. 6 is a block diagram of an example relevant object trajectory determination system that may be configured to perform the disclosed techniques, in accordance with examples of the disclosure.
Figure 7:
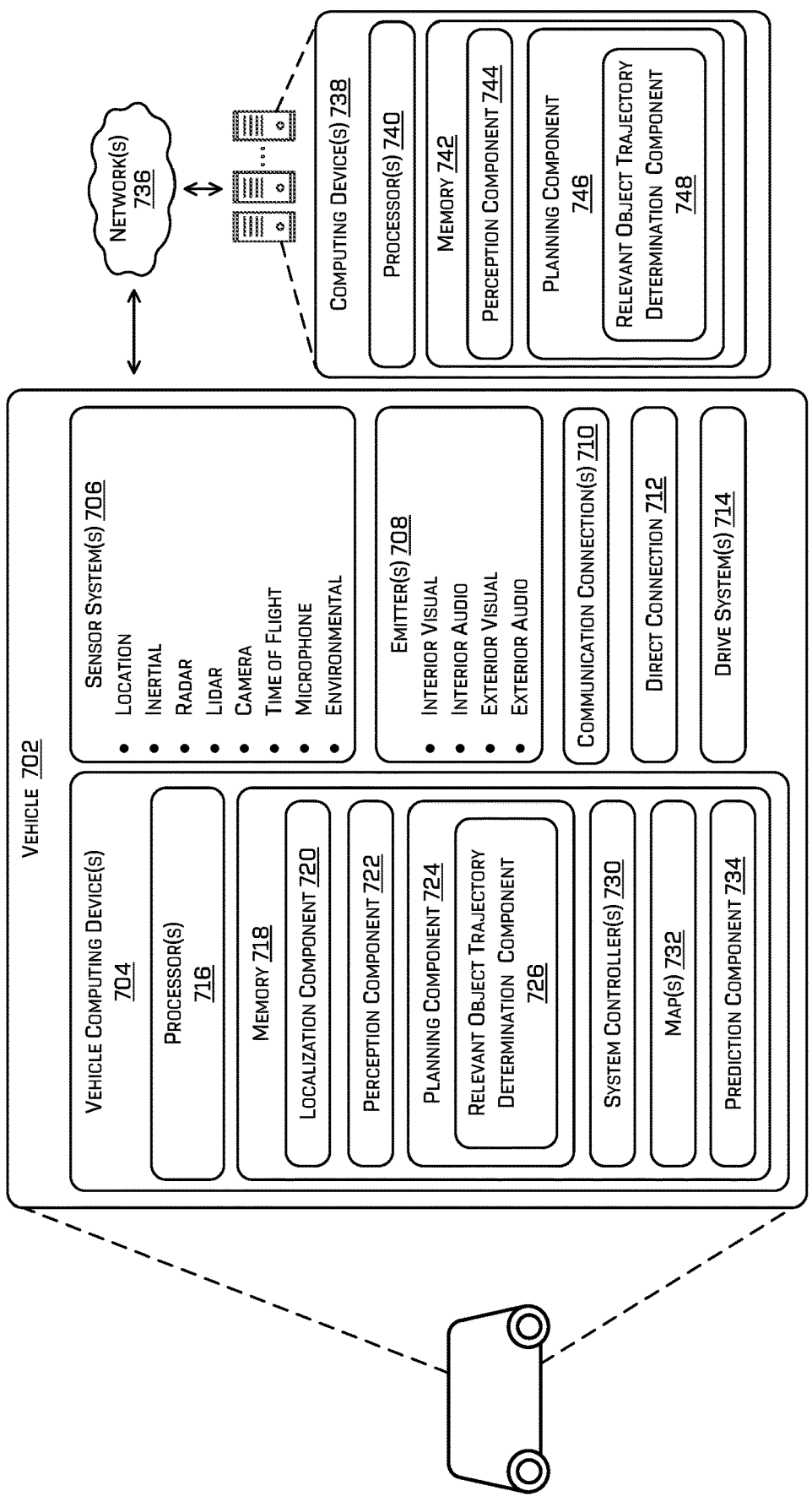
FIG. 7 depicts a block diagram of an example system for implementing various techniques described herein.

FIG. 6 is a block diagram of a relevant object trajectory determination system 600 according to various examples. The system 600 may be implemented at a vehicle (e.g., an autonomous vehicle) by a vehicle computing system and/or by a remote system. In various examples, the system may be implemented at, or interact with, a perception system, a prediction system, a tracking system, and/or planning system that may be configured to control a vehicle and/or to provide data, including trajectory data, for use in controlling a vehicle. The system 600 may include one or more of the components and systems illustrated in FIG. 7 and described below. These components may be configured as described herein or in any other configuration and may perform any subset of their associated operations in any or and/or in conjunction with other one or more other operations. For example, one or more components and systems can include those associated with processors 716 and/or 740, memories 718 and/or 742, perception component 722, planning component 724, relevant object trajectory determination component 726, and/or prediction component 734 illustrated in FIG. 7. In examples, the one or more operations performed by the system 600 may be performed by a remote system in communication with a vehicle, such as perception component 744, planning component 746, and/or relevant object trajectory determination component 748 illustrated in FIG. 7. In still other examples, the one or more operations performed by the system 600 may be performed by a combination of a remote system and a vehicle computing system. However, the system 600 is not limited to such components and systems, and the components and systems of FIG. 7 are not limited to performing the operations performed by the components of system 600.

In various examples, a relevant object trajectory determination system 600 may be configured at a vehicle that may include a vehicle computing system 604. The vehicle computing system 604 may receive or collect sensor data 602 from one or more sensors configured at the vehicle. The vehicle computing system may include one or more components not shown here, such as those described in regard to FIG. 7, that may interact with the components of the relevant object trajectory determination system 600 to perform the operations described herein.

The vehicle computing system 604 may include a planning component 606 that may be configured to determine candidate vehicle trajectories, operational vehicle trajectories (e.g., from among candidate vehicle trajectories), predicted object trajectories, and/or associations therebetween. For example, the planning component 606 may include or otherwise be associated with an occupancy grid determination system 608. The occupancy grid determination system 608 may be configured to determine occupancy grid data as described herein.

For example, the occupancy grid determination system 608 may include or otherwise be associated with an object position determination component 610 that may determine a current position for an object (e.g., detected in an environment). In examples, the component 610 may be implemented by and/or otherwise interact with a perception component to determine object positions.

The occupancy grid determination system 608 may also, or instead, include or otherwise be associated with an object trajectory determination component 612 that may determine a predicted object trajectory for an object (e.g., detected in an environment). In examples, the component 612 may be implemented by and/or otherwise interact with a prediction component to determine predicted object trajectories.

The occupancy grid determination system 608 may also, or instead, include or otherwise be associated with a vehicle position determination component 614 that may determine a current position for the vehicle associated with the vehicle computing system 604. In examples, the component 614 may be implemented by and/or otherwise interact with a localization component to determine a current vehicle position. As will be appreciated, such an occupancy grid component 622 and/or relevance determination component 624 may be performed in parallel using General Purpose-computing on Graphics Processing Unit (GPGPU) to explore all potential interactions substantially simultaneously.

The occupancy grid determination system 608 may also, or instead, include or otherwise be associated with a candidate vehicle trajectory determination component 616 that may determine one or more candidate vehicle trajectories as described herein. In examples, the component 616 may be implemented by and/or otherwise interact with a mapping component, a localization component, a prediction component, a perception component, and/or other components to determine these candidate vehicle trajectories.

The occupancy grid determination system 608 may also, or instead, include or otherwise be associated with an estimated occupancy time determination component 618 that may determine occupancy times as described herein. For example, the component 618 may determine minimum and maximum occupancy times for objects (e.g., based on associated predicted object trajectories) and/or the vehicle (e.g., based on the candidate vehicle trajectory associated with the occupancy grid) for cells in an occupancy grid associated with a particular candidate vehicle trajectory (e.g., as described herein).

The occupancy grid determination system 608 may also, or instead, include or otherwise be associated with a predicted occupancy pose determination component 620 that may determine a predicted pose for objects and/or the vehicle for individual cells in the occupancy grid as described herein. For example, the component 620 may determine a predicted pose (e.g., heading, position) for an object predicted to occupy a portion of the environment associated with a cell of the occupancy grid (e.g., based on associated predicted object trajectories) and/or a predicted pose (e.g., heading, position) for the vehicle predicted to occupy a portion of the environment associated with a cell of the occupancy grid (e.g., based on the candidate vehicle trajectory associated with the occupancy grid) (e.g., as described herein).

Using the information determined by these components (e.g., occupancy times and poses), the occupancy grid determination system 608 may determine an occupancy grid 622 that may be provided to a relevance determination component 624. The relevance determination component 624 may use the occupancy grid data to determine the predicted object trajectories that may be relevant to individual candidate vehicle trajectories as described herein. The relevance determination component 624 may associated the determined relevant predicted object trajectories with the individual candidate vehicle trajectories to which they are relevant and provide this data as candidate trajectories and associated relevant object trajectories 626 to an operational trajectory determination component 628.

The operational trajectory determination component 628 may use this data (e.g., relevant object trajectories 626), in examples along with other data and/or information, to determine an operational trajectory 630 for the vehicle. The planning component 606 may provide the operational trajectory 630 to a vehicle control system 632 at or associated with the vehicle computing system 604 for use in controlling the vehicle.

FIG. 7 depicts a block diagram of an example system 700 for implementing the techniques described herein. In at least one example, the system 700 can include a vehicle 702. The vehicle 702 can include a vehicle computing device 704 that may function as and/or perform the functions of a vehicle controller for the vehicle 702. The vehicle 702 can also include one or more sensor systems 706, one or more emitters 708, one or more communication connections 710, at least one direct connection 712, and one or more drive systems 714.

The vehicle computing device 704 can include one or more processors 716 and memory 718 communicatively coupled with the one or more processors 716. In the illustrated example, the vehicle 702 is an autonomous vehicle; however, the vehicle 702 could be any other type of vehicle. In the illustrated example, the memory 718 of the vehicle computing device 704 stores a localization component 720, a perception component 722, a planning component 724, one or more system controllers 730, one or more maps 732, a prediction component 734, and/or one or more relevant object trajectory determination components 726. Though depicted in FIG. 7 as residing in memory 718 for illustrative purposes, it is contemplated that each of the localization component 720, the perception component 722, the planning component 724, the one or more system controllers 730, the one or more maps 732, the prediction component 734, and/or the one or more relevant object trajectory determination components 726 can additionally, or alternatively, be accessible to the vehicle 702 (e.g., stored remotely). Alternatively or additionally, the one or more relevant object trajectory determination components 726 may be a component of and/or associated with a remote computing device and/or a separate (e.g., secondary) computing device.

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for generating map data, as discussed herein.

In some instances, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 722 can provide processed sensor data that indicates one or more characteristics associated with a detected entity (e.g., a tracked object) and/or the environment in which the entity is positioned. The perception component 722 may use multichannel data structures, such as multichannel data structures generated by a deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 724 can determine a path for the vehicle 702 to follow to traverse through an environment. In examples, the planning component 724 can determine various routes and trajectories and various levels of detail. For example, the planning component 724 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 724 can generate an instruction for guiding the autonomous vehicle along at least a portion of the route from the first location to the second location. In at least one example, the planning component 724 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate. In some examples, the planning component 724 may include one or more relevant object trajectory determination components 726 that may be configured to perform one or more of the operations described herein to determine relevant predicted object trajectories for one or more candidate vehicle trajectories.

In at least one example, the vehicle computing device 704 can include one or more system controllers 730, which can be configured to control steering, propulsion, braking, safety, emitters, communication, and other systems of the vehicle 702. These system controller(s) 730 can communicate with and/or control corresponding systems of the drive system(s) 714 and/or other components of the vehicle 702.

The memory 718 can further include one or more maps 732 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 732 can include at least one map (e.g., images and/or a mesh). In some examples, the vehicle 702 can be controlled based at least in part on the maps 732. That is, the maps 732 can be used in connection with the localization component 720, the perception component 722, and/or the planning component 724 to determine a location of the vehicle 702, identify objects in an environment, and/or generate routes and/or trajectories to navigate within an environment.

In some examples, the one or more maps 732 can be stored on a remote computing device(s) (such as the computing device(s) 738) accessible via network(s) 736. In some examples, multiple maps 732 can be stored based on, for example, a characteristic (e.g., type of entity, time of day, day of week, season of the year, etc.). Storing multiple maps 732 can have similar memory requirements but increase the speed at which data in a map can be accessed.

In general, the prediction component 734 can generate predicted trajectories of objects in an environment. For example, the prediction component 734 can generate one or more predicted trajectories for vehicles, pedestrians, animals, and the like within a threshold distance from the vehicle 702. In some instances, the prediction component 734 can measure a trace of an object and generate a trajectory for the object based on observed and predicted behavior. The prediction component 734 may interact with the planning component 724 and/or the relevant object trajectory determination component 726 as described herein to determine relevant predicted object trajectories and an operational trajectory, for example, based on one or more candidate trajectories.

In some instances, aspects of some or all of the components discussed herein can include any models, algorithms, and/or machine learning algorithms. For example, in some instances, the components in the memory 718 (and the memory 742, discussed below) can be implemented as a neural network. For instance, the memory 718 may include a deep tracking network that may be configured with a convolutional neural network (CNN). The CNN may include one or more convolution/deconvolution layers. Alternatively, or in addition, the relevant object trajectory determination component 726 may include or be implemented by a CNN that may perform operations as described herein.

An example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a braking trajectory. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 706 can include multiple instances of each of these or other types of sensors. For instance, the camera sensors can include multiple cameras disposed at various locations about the exterior and/or interior of the vehicle 702. The sensor system(s) 706 can provide input to the vehicle computing device 704. Additionally, or alternatively, the sensor system(s) 706 can send sensor data, via the one or more networks 736, to the one or more computing device(s) at a particular frequency, after a lapse of a predetermined period of time, in near real-time, etc.

The vehicle 702 can also include one or more emitters 708 for emitting light (visible and/or non-visible) and/or sound. The emitter(s) 708 in an example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device 704 to another computing device or a network, such as network(s) 736. For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 may also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In some examples, the vehicle 702 can send sensor data, audio data, collision data, and/or other types of data to one or more computing device(s) 738 via the network(s) 736. In some examples, the vehicle 702 can send raw sensor data to the computing device(s) 738. In other examples, the vehicle 702 can send processed sensor data and/or representations of sensor data (e.g., multichannel data structures representing sensor data) to the computing device(s) 738. In some examples, the vehicle 702 can send sensor data to the computing device(s) 738 at a particular frequency, after a lapse of a predetermined period of time, in near real-time, etc. In some cases, the vehicle 702 can send sensor data (raw or processed) to the computing device(s) 738 as one or more log files.

The computing device(s) 738 can include processor(s) 740 and a memory 742 storing one or more perception components 744, planning components 746, and/or a relevant object trajectory determination component 748. In some instances, the relevant object trajectory determination component 748 can substantially correspond to the relevant object trajectory determination component 726 and can include substantially similar functionality. In some instances, the planning component 746 can substantially correspond to the planning component 724 and can include substantially similar functionality.

The processor(s) 716 of the vehicle 702 and the processor(s) 740 of the computing device(s) 738 can be any suitable processor capable of executing instructions to process data and perform operations as described herein. By way of example and not limitation, the processor(s) 716 and 740 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICS, etc.), gate arrays (e.g., FPGAs, etc.), and other hardware devices can also be considered processors in so far as they are configured to implement encoded instructions.

Memory 718 and 742 are examples of non-transitory computer-readable media. The memory 718 and 742 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 738 and/or components of the computing device(s) 738 can be associated with the vehicle 702. That is, the vehicle 702 can perform one or more of the functions associated with the computing device(s) 738, and vice versa.

Example Clauses

The following paragraphs describe various examples. Any of the examples in this section may be used with any other of the examples in this section and/or any of the other examples or embodiments described herein.

A: A system comprising: one or more processors; and one or more non-transitory computer-readable media storing computer-executable instructions that, when executed, cause the one or more processors to perform operations comprising: receiving sensor data associated with an environment; determining a set of actions for controlling a vehicle through the environment; detecting, based at least in part on the sensor data, an object within the environment; determining, based at least in part on the sensor data, a set of predicted object trajectories associated with the object; determining, for a predicted trajectory of the set of predicted object trajectories, a first portion of an occupancy grid representing the object in the environment during a period of time; determining, based at least in part on an action of the set of actions, a second portion of the occupancy grid representing the vehicle in the environment during the period of time; determining, based at least in part on the first and second portion, a relevancy score representing a relevance of the predicted trajectory to the action; associating, based at least in part on determining that the relevancy score meets or exceeds a relevancy threshold value, the predicted trajectory with the action; determining, based at least in part on the relevancy score, the action, and the predicted trajectory, a candidate trajectory; and controlling the vehicle based at least in part on the candidate trajectory.

B: The system of paragraph A, wherein determining the relevancy score is further based at least in part on one or more of: determining the first portion and the second portion comprise a same cell, or determining whether a heading of the vehicle substantially aligns with a heading of the object in the same cell.

C: The system of paragraph A or B, wherein the operations further comprise: determining for a cell associated with both the first and second portions of the occupancy grid, a minimum vehicle time associated with the vehicle being associated with the cell, a maximum vehicle time associated with the vehicle being associated with the cell, a minimum object time associated with the object being associated with the cell, and a maximum object time associated with the object being associated with the cell, and wherein the relevancy score is further based at least in part on one or more of the minimum vehicle time, maximum vehicle time, minimum object time, or maximum object time.

D: The system of any of paragraphs A-C, wherein the relevancy score is determined based at least in part on an exponential function.

E: The system of any of paragraphs A-D, wherein the operations further comprise: detecting, based at least in part on the sensor data, a second object within the environment; determining, based at least in part on the sensor data, a second predicted trajectory associated with the second object; associating, based at least in part on the period of time, the second object with a third portion of the occupancy grid; and determining, based at least in part on the third portion and one or more of the first portion or the second portion, a second relevancy score representing a second relevance of the second object, wherein determining the candidate trajectory comprises excluding information about the second object based at least in part on the second relevancy score being less than or equal to the relevancy threshold value.

F: One or more non-transitory computer-readable media storing instructions executable by one or more processors, wherein the instructions, when executed, cause the one or more processors to perform operations comprising: receiving an action to control a vehicle through an environment; receiving a predicted trajectory associated with an object proximate the vehicle; associating, based at least in part on the action, vehicle information with a first portion of an occupancy grid associated with a period of time; associating, based at least in part on the predicted trajectory, object information with a second portion of the occupancy grid associated with the period of time; determining, for a cell of the occupancy grid and based at least in part on the object information and the vehicle information, a relevancy score representing a relevance of the predicted trajectory to a candidate trajectory; and controlling the vehicle based at least in part on the relevancy score.

G: The one or more non-transitory computer-readable media of paragraph F, wherein determining the relevancy score comprises: determining a first occupancy time associated with the vehicle for a cell of the first portion; and determining a second occupancy time associated with the object for the cell.

H: The one or more non-transitory computer-readable media of paragraph G, wherein: determining the first occupancy time is based at least in part on a maximum acceleration associated with the vehicle; determining the second occupancy time is based at least in part on a minimum acceleration associated with the object; and determining the relevancy score to be zero if the first occupancy time is greater than the second occupancy time.

I: The one or more non-transitory computer readable media of paragraph G, wherein: determining the first occupancy time is based at least in part on a maximum acceleration associated with the vehicle; determining the second occupancy time is based at least in part on a maximum acceleration associated with the object; and determining the relevancy score is based at least in part on evaluating a function of the first occupancy time and the second occupancy time.

J: The one or more non-transitory computer-readable media of any of paragraphs F-I, wherein determining the relevancy score comprises: determining an object type of the object; determining a weighting factor based at least in part on the object type of the object; and determining the relevancy score further based at least in part on the weighting factor.

K: The one or more non-transitory computer-readable media of any of paragraphs F-J, wherein determining the relevancy score is further based at least in part on one or more of: a first position of the object, a first heading of the object, a second position of the vehicle, or a second heading of the vehicle.

L: The one or more non-transitory computer-readable media of any of paragraphs F-K, wherein the action is one of a plurality of actions, the predicted trajectory is one of a plurality of predicted trajectories, and the operations further comprise: associating an index with each action of the plurality of actions; determining a lowest index associated with the relevancy score at a first time; determining a highest index associated with an additional relevancy score associated with a second time after the first time; and determining a set of predicted object trajectories associated with actions having an index greater than or equal to the lowest index and less than or equal to the highest index, wherein controlling the vehicle is further based at least in part on the set of predicted object trajectories.

M: The one or more non-transitory computer-readable media of any of paragraphs F-L, wherein the operations further comprise: determining, based at least in part on the object information and the vehicle information, that the predicted trajectory is irrelevant to the candidate trajectory; and controlling the vehicle further comprises controlling the vehicle based at least in part on the candidate trajectory and excluding the predicted trajectory.

N: The one or more non-transitory computer-readable media of any of paragraphs F-M, wherein the action comprises one or more of: turn left, turn right, merge left, merge right, or continue along a path.

O: A method comprising: receiving an action to control a vehicle through an environment; receiving a predicted trajectory associated with an object proximate to the vehicle; associating, based at least in part on the action, vehicle information with a first portion of an occupancy grid associated with a period of time; associating, based at least in part on the predicted trajectory, object information with a second portion of the occupancy grid associated with the period of time; determining, for a cell of the occupancy grid and based at least in part on the object information and the vehicle information, a relevancy score representing a relevance of the predicted trajectory to a candidate trajectory; and controlling the vehicle based at least in part on the relevancy score.

P: The method of paragraph O, wherein determining the relevancy score is further based at least in part on one or more of: a first heading of the vehicle at the first portion of the occupancy grid; a second heading of the object at the second portion of the occupancy grid; a first occupancy time representing occupancy of the vehicle at the first portion of the occupancy grid; or a second occupancy time representing occupancy by the object at the second portion of the occupancy grid.

Q: The method of paragraph O or P, further comprising storing a first subset of the vehicle information and a second subset of the object information in a state array associated with the cell.

R: The method of any of paragraphs O-Q, wherein determining the relevancy score comprises: determining an aggregated relevancy score based at least in part on vehicle information and object information associated with a plurality of cells of the occupancy grid; and determining the relevancy score based on a comparison of the aggregated relevancy score to a relevancy score threshold value.

S: The method of any of paragraphs O-R, wherein determining the relevancy score comprises: determining an object type of the object; determining a weighting factor based at least in part on the object type of the object; and determining the relevancy score further based at least in part on the weighting factor.

T: The method of any of paragraphs O-T, further comprising: determining, based at least in part on the object information and the vehicle information, that the predicted trajectory is irrelevant to the candidate trajectory; and controlling the vehicle further comprises controlling the vehicle based at least in part on the candidate trajectory and excluding the predicted trajectory.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
receiving sensor data associated with an environment;
determining a set of actions for controlling a vehicle through the environment;
associating an index with each action of the set of actions;
determining at least one of a lowest index action or a highest index action;
detecting, based at least in part on the sensor data, an object within the environment;
determining, based at least in part on the sensor data, a set of predicted object trajectories associated with the object;
determining, for a predicted trajectory of the set of predicted object trajectories, a first portion of an occupancy grid representing the object in the environment during a period of time;
determining, based at least in part on the lowest index action or the highest index action, an action of the set of actions and an index associated with the action;
determining, based at least in part on the action of the set of actions, a second portion of the occupancy grid representing the vehicle in the environment during the period of time;
determining, based at least in part on the first and second portions, a relevancy score representing a relevance of the predicted trajectory to the action;
associating, based at least in part on determining that the relevancy score meets or exceeds a relevancy threshold value, the predicted trajectory with the action;
associating, based at least in part on associating the predicted trajectory with the action, the relevancy score with the index associated with the action;
determining, based at least in part on the relevancy score, the action, and the predicted trajectory, a candidate trajectory; and
controlling the vehicle based at least in part on the candidate trajectory.

2. The system of claim 1, wherein determining the relevancy score is further based at least in part on one or more of:
determining the first portion and the second portion comprise a same cell, or
determining, based at least in part on a direction of travel, whether a heading of the vehicle is within a predetermined threshold of a heading of the object in the same cell.

3. The system of claim 1, wherein the operations further comprise:
determining for a cell associated with both the first and second portions of the occupancy grid, a minimum vehicle time associated with the vehicle being associated with the cell, a maximum vehicle time associated with the vehicle being associated with the cell, a minimum object time associated with the object being associated with the cell, and a maximum object time associated with the object being associated with the cell, and
wherein the relevancy score is further based at least in part on one or more of the minimum vehicle time, maximum vehicle time, minimum object time, or maximum object time.

4. The system of claim 3, wherein the relevancy score is determined based at least in part on an exponential function.

5. The system of claim 1, wherein the operations further comprise:
detecting, based at least in part on the sensor data, a second object within the environment;
determining, based at least in part on the sensor data, a second predicted trajectory associated with the second object;
associating, based at least in part on the period of time, the second object with a third portion of the occupancy grid; and
determining, based at least in part on the third portion and one or more of the first portion or the second portion, a second relevancy score representing a second relevance of the second object,
wherein determining the candidate trajectory comprises excluding information about the second object based at least in part on the second relevancy score being less than or equal to the relevancy threshold value.

6. One or more non-transitory computer-readable media storing instructions executable by one or more processors, wherein the instructions, when executed, cause the one or more processors to perform operations comprising:
receiving, based at least in part on an index, an action to control a vehicle through an environment, wherein the index is an index of a plurality of indices, each index of the plurality of indices respectively associated with each action of a plurality of actions, and wherein the plurality of indices comprises a highest index and a lowest index;
determining, based at least in part on the lowest index or the highest index, an action of the plurality of actions and an index associated with the action;
receiving a predicted trajectory associated with an object proximate the vehicle;
associating, based at least in part on the action, vehicle information with a first portion of an occupancy grid associated with a period of time;
associating, based at least in part on the predicted trajectory, object information with a second portion of the occupancy grid associated with the period of time;
determining, for a cell of the occupancy grid and based at least in part on the object information and the vehicle information, a relevancy score representing a relevance of the predicted trajectory to a candidate trajectory;

associating, based at least in part on the predicted trajectory and the action, the relevancy score with the index associated with the action; and controlling the vehicle based at least in part on the relevancy score.

7. The one or more non-transitory computer-readable media of claim 6, wherein determining the relevancy score comprises:
determining a first occupancy time associated with the vehicle for a cell of the first portion; and
determining a second occupancy time associated with the object for the cell.

8. The one or more non-transitory computer-readable media of claim 7, wherein:
determining the first occupancy time is based at least in part on a maximum acceleration associated with the vehicle;
determining the second occupancy time is based at least in part on a minimum acceleration associated with the object; and
determining the relevancy score to be zero if the first occupancy time is greater than the second occupancy time.

9. The one or more non-transitory computer-readable media of claim 7, wherein:
determining the first occupancy time is based at least in part on a maximum acceleration associated with the vehicle;
determining the second occupancy time is based at least in part on a maximum acceleration associated with the object; and
determining the relevancy score is based at least in part on evaluating a function of the first occupancy time and the second occupancy time.

10. The one or more non-transitory computer-readable media of claim 6, wherein determining the relevancy score comprises:
determining an object type of the object;
determining a weighting factor based at least in part on the object type of the object; and
determining the relevancy score further based at least in part on the weighting factor.

11. The one or more non-transitory computer-readable media of claim 6, wherein determining the relevancy score is further based at least in part on one or more of:
a first position of the object,
a first heading of the object,
a second position of the vehicle, or
a second heading of the vehicle.

12. The one or more non-transitory computer-readable media of claim 6, wherein the predicted trajectory is one of a plurality of predicted trajectories, and the operations further comprise:
determining the lowest index is associated with the relevancy score at a first time;
determining the highest index is associated with an additional relevancy score associated with a second time after the first time; and
determining a set of predicted object trajectories associated with actions having an index greater than or equal to the lowest index and less than or equal to the highest index,
wherein controlling the vehicle is further based at least in part on the set of predicted object trajectories.

13. The one or more non-transitory computer-readable media of claim 6, wherein the operations further comprise:

determining, based at least in part on the object information and the vehicle information, that the predicted trajectory is irrelevant to the candidate trajectory; and
controlling the vehicle further comprises controlling the vehicle based at least in part on the candidate trajectory and excluding the predicted trajectory.

14. The one or more non-transitory computer-readable media of claim 6, wherein the action comprises one or more of:
turn left,
turn right,
merge left,
merge right, or
continue along a path.

15. A method comprising:
receiving, based at least in part on an index of a plurality of indices comprising a highest index and a lowest index, an action to control a vehicle through an environment, each index of the plurality of indices respectively associated with each action of a plurality of actions;
determining, based at least in part on the lowest index or the highest index, an action of the plurality of actions and an index associated with the action;
receiving a predicted trajectory associated with an object proximate to the vehicle;
associating, based at least in part on the action, vehicle information with a first portion of an occupancy grid associated with a period of time;
associating, based at least in part on the predicted trajectory, object information with a second portion of the occupancy grid associated with the period of time;
determining, for a cell of the occupancy grid and based at least in part on the object information and the vehicle information, a relevancy score representing a relevance of the predicted trajectory to a candidate trajectory;
associating, based at least in part on the predicted trajectory and the action, the relevancy score with the index associated with the action; and
controlling the vehicle based at least in part on the relevancy score.

16. The method of claim 15, wherein determining the relevancy score is further based at least in part on one or more of:
a first heading of the vehicle at the first portion of the occupancy grid;
a second heading of the object at the second portion of the occupancy grid;
a first occupancy time representing occupancy of the vehicle at the first portion of the occupancy grid; or
a second occupancy time representing occupancy by the object at the second portion of the occupancy grid.

17. The method of claim 15, further comprising storing a first subset of the vehicle information and a second subset of the object information in a state array associated with the cell.

18. The method of claim 15, wherein determining the relevancy score comprises:
determining an aggregated relevancy score based at least in part on vehicle information and object information associated with a plurality of cells of the occupancy grid; and
determining the relevancy score based on a comparison of the aggregated relevancy score to a relevancy score threshold value.

19. The method of claim 15, wherein determining the relevancy score comprises:
- determining an object type of the object;
- determining a weighting factor based at least in part on the object type of the object; and
- determining the relevancy score further based at least in part on the weighting factor.

20. The method of claim 15, further comprising:
- determining, based at least in part on the object information and the vehicle information, that the predicted trajectory is irrelevant to the candidate trajectory; and
- controlling the vehicle further comprises controlling the vehicle based at least in part on the candidate trajectory and excluding the predicted trajectory.

* * * * *